(12) United States Patent
Kim et al.

(10) Patent No.: US 12,476,503 B2
(45) Date of Patent: Nov. 18, 2025

(54) MOTOR FOR LAUNDRY APPARATUS

(71) Applicant: LG ELECTRONICS INC., Seoul (KR)

(72) Inventors: Sunho Kim, Seoul (KR); Kyeong-Hwan Kim, Seoul (KR); Seung-Suk Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 287 days.

(21) Appl. No.: 18/103,817

(22) Filed: Jan. 31, 2023

(65) Prior Publication Data

US 2023/0283129 A1  Sep. 7, 2023

(30) Foreign Application Priority Data

Mar. 3, 2022 (KR) .................. 10-2022-0027456

(51) Int. Cl.
*H02K 1/2786* (2022.01)
*D06F 37/30* (2020.01)
*D06F 58/20* (2006.01)
*H02K 1/12* (2006.01)
(Continued)

(52) U.S. Cl.
CPC ......... *H02K 1/2786* (2013.01); *D06F 37/304* (2013.01); *D06F 58/20* (2013.01); *H02K 1/12* (2013.01); *H02K 5/04* (2013.01); *H02K 7/14* (2013.01)

(58) Field of Classification Search
CPC .......... H02K 1/2786; H02K 1/12; H02K 5/04; H02K 7/14; H02K 1/30; H02K 1/32; H02K 5/1735; H02K 21/22; H02K 9/06; H02K 1/2789; H02K 1/2791; H02K 1/17; H02K 1/28; H02K 9/02; H02K 21/14; H02K 2201/03; D06F 37/304; D06F 58/20; D06F 37/30; D06F 58/08
See application file for complete search history.

(56) References Cited

U.S. PATENT DOCUMENTS

2005/0166643 A1  8/2005  Cho et al.
2013/0278094 A1  10/2013  Peterson et al.

FOREIGN PATENT DOCUMENTS

| EP | 1450468 A2 * | 8/2004 | ............... H02K 9/06 |
| EP | 1784904 | 8/2014 | |
| JP | 2003111355 | 4/2003 | |

(Continued)

OTHER PUBLICATIONS

Extended Search Report in European Appln. No. 23152637.7, mailed on Jul. 24, 2023, 13 pages.

(Continued)

*Primary Examiner* — Mohamad A Musleh
(74) *Attorney, Agent, or Firm* — Fish & Richardson P.C.

(57) ABSTRACT

A motor for a laundry apparatus includes a stator and a rotor including a rotor frame which rotates outside the stator. The rotor frame includes a base frame having a circular shape and disposed with a distance from a coil, an extension frame which fixes a magnet, an air inlet which suctions air, and a blade protruding to a set height from the base frame, and the blade is positioned outside a region in which the coil is disposed. According to the present disclosure, the heat dissipation performance of the motor can be improved while maintaining the strength of the rotor frame, and motor output can be improved by sufficiently securing a winding space of the coil.

20 Claims, 22 Drawing Sheets

(51) Int. Cl.
*H02K 5/04* (2006.01)
*H02K 7/14* (2006.01)

(56) References Cited

FOREIGN PATENT DOCUMENTS

| | | | |
|---|---|---|---|
| JP | 2003111355 A | * | 4/2003 |
| KR | 20040036189 | | 4/2004 |
| KR | 20040036189 A | * | 4/2004 |
| KR | 20040075253 | | 8/2004 |
| KR | 20050122565 | | 12/2005 |
| KR | 20060031275 | | 4/2006 |
| KR | 20060054531 | | 5/2006 |
| KR | 20060084463 | | 11/2006 |
| KR | 20110089987 | | 8/2011 |
| WO | WO 2018 228172 | | 12/2018 |

OTHER PUBLICATIONS

Office Action in Korean Appln. No. 20220027456, mailed on Aug. 19, 2023, 26 pages (with English translation).

* cited by examiner

150(151)  160  145  141  1411

MOTOR FOR LAUNDRY APPARATUS

CROSS-REFERENCE TO RELATED APPLICATION

This application claims priority to and the benefit of Korean Patent Application No. 10-2022-0027456, filed on Mar. 3, 2023, the disclosure of which is incorporated herein by reference in its entirety.

TECHNICAL FIELD

Embodiments of the present disclosure relate to a motor for a laundry apparatus, and more specifically, to a motor for a laundry apparatus in which the output and efficiency of the motor is improved by sufficiently securing a winding space of a coil and the heat dissipation performance of the motor is also improved by providing an air inlet and a blade so that there is no structural interference with the coil.

BACKGROUND

The contents described below are only described to provide background information related to embodiments of the present disclosure, and the contents described do not naturally constitute the related art.

The concept of a laundry apparatus includes a laundry treating apparatus such as, specifically, a washer for washing clothes and a dryer for drying wet clothes after washing.

The washer includes a water tub for accommodating washing water, a rotating tub which rotates inside the water tub, a pulsator which rotates inside the rotating tub, and a motor which provides a rotational force to the rotating tub and the pulsator.

When laundry is put into the rotating tub, the laundry accommodated inside the rotating tub is stirred with the washing water by rotation of the pulsator and the rotating tub which are rotated by the motor. As a result, contaminants in the laundry are removed.

The motor of the washer is axially connected to the pulsator and transmits the rotational force to the pulsator to rotate the pulsator. In addition, the motor of the washer selectively transmits the rotational force to the rotating tub through clutch operation and rotates the rotating tub. As described above, in the washer, the rotation operation of the pulsator and the rotation operation of the rotating tub may be selectively used to implement operation of a washing mode and a spin-drying mode.

In addition, an outer rotor type motor may be used in a laundry apparatus such as a washer.

The outer rotor type motor is a motor having an outer rotor. In other words, the outer rotor type motor is a motor having a form in which a rotor rotates outside a stator, and the inertia of the rotor is large, which is advantageous for constant-speed rotation and has an advantage of being suitable for high-speed operation.

In addition, in the outer rotor type motor, a magnet of the rotor may be large. Accordingly, the outer rotor type motor has an advantage of being able to generate a large torque.

For example, a shaft driving a washer, that is, a washing shaft, is connected to a rotor, and the washing shaft directly receives a rotational force of the rotor and rotates.

Recently, with a trend of increasing the capacity of household appliances, the need for high-efficiency motors used in laundry apparatuses such as washers and the like is increasing. Accordingly, a rotor frame included in a motor should secure the rigidity of the motor itself and also should have a heat dissipation function by dissipating heat generated by the motor.

In order to secure a heat dissipation function of a motor, an air inlet and a blade may be formed on a rotor frame facing a lower portion of a coil. However, when the blade is formed, a coil winding space is additionally required to secure a volume of the coil. Accordingly, there is a problem that a size of the motor, for example, a height of the motor, is increased.

In other words, an increase in a protruding height of the blade is important to increase the heat dissipation performance of the motor, but it is difficult to increase the height of the blade to a satisfactory level due to a height constraint of the motor.

When the blade protruding to a predetermined height from a lower inner side of a rotor frame toward the lower portion of the coil is omitted, the volume of the coil may be secured at the required level. However, when the blade is omitted, rotation of an airflow introduced through an air inlet is not induced, and thus there is a problem that a heat dissipation characteristic of the motor is significantly degraded.

Related art discloses a motor and a washer in which the motor is installed.

A motor disclosed in the related art has a structure in which a cooling hole is formed in a lower side surface of a rotor cup (that is, a frame), and a lower blade is formed as a backward-type to increase a speed of cold air in a radially outward direction from a center of the rotor cup (that is, the frame). In addition, the motor has a heat dissipation structure in which a vent is formed in a side surface of the rotor cup (that is, the frame) so that air smoothly flows through the cooling hole and the vent to improve the heat dissipation performance of a lower side of a stator.

However, in the motor disclosed in the related art, a plurality of the blades are positioned in a portion facing a lower portion of a coil in the frame (that is, the rotor cup). Accordingly, an additional coil winding space is required in order to secure a volume of the coil required to improve the performance of the motor. Accordingly, an overall height of the motor is increased, and thus it is difficult to satisfy the compactness and high-efficiency of the motor.

In addition, a blade structure applied to a heat dissipation structure of the motor disclosed in the related art is a backward-type structure of which a mold becomes complicated in order to form the backward-type blade inside the frame, and thus the motor has a disadvantage of poor manufacturability.

In addition, the backward-type blade structure disclosed in the related art has a disadvantage that it is difficult to increase the number of parts applied to the frame having a constant area. In addition, when there are many teeth, coils may be wound at several positions, and in this case, there is a problem that the cooling performance between the coils may be degraded.

In addition, since the heat dissipation structure of the motor disclosed in the related art is not a structure which guides a flow of air for cooling toward the coil, there is a disadvantage that it is insufficient to improve the heat dissipation performance of the motor.

Other related art discloses a rotor structure of a motor for a drum washer.

In a rotor structure of a motor disclosed in the other related art, a long hole is radially formed in a bottom portion of a rotor, and a blade is provided in the long hole.

However, in the case of the rotor of the other related art, the blade is disposed to face a lower portion of a coil, and due to a height of the blade, a winding space of the coil should be further secured to secure a volume of the coil. Accordingly, an overall height of the motor increases. Accordingly, it is difficult to satisfy the compactness and high-efficiency of the motor.

In addition, in the rotor of the other related art, since there is a limit in height of the blade in order to secure the winding space of the coil, there is a limit to improving the heat dissipation performance of the motor.

Other related art discloses a laundry device.

A rotor disclosed in the other related art includes a plurality of heat dissipation holes and a blade which guides air to the plurality of heat dissipation holes.

However, in the case of the rotor of the other related art, the heat dissipation holes and the blade are formed at a base portion (that is, a lower portion of a frame) of the rotor and are positioned to face a winding space of a coil.

Accordingly, there are problems that a height of the blade is constrained, and when the blade protrudes to a required height, a height of the motor should be increased as much as necessary to secure the winding space of the coil.

In addition, in the case of the rotor disclosed in the other related art, since the rotor does not have a structure which guides a flow of air, which is suctioned when the blade rotates, toward the coil, there is a disadvantage that it is insufficient to improve the heat dissipation performance of the motor by cooling the coil.

In addition, in the other related art, since the heat dissipation holes are formed long in a radial direction of the base portion of the rotor, there is a disadvantage that it is difficult to secure the rigidity of the rotor.

Accordingly, in an outer rotor type motor having an outer rotor, a structural improvement that an air inlet and a blade are provided in a lower portion of a rotor frame to secure a winding space of a coil to increase a volume of the coil while improving the cooling performance of the motor is required.

SUMMARY

The present disclosure is directed to providing a motor for a laundry apparatus in which a blade having a predetermined height is formed at a lower portion of a rotor frame so as not to affect a winding space of a coil, and thus a volume of the coil is increased to improve the output and efficiency of the motor and the heat dissipation performance of the motor at the same time in an outer rotor type motor having an outer rotor.

The present disclosure is directed to providing a motor for a laundry apparatus in which a blade is aligned to be biased to one side of an air inlet in consideration of a rotation direction of the rotor so that air, which is suctioned by a vortex generated when the blade rotates, flows toward a coil, in an outer rotor type motor having an outer rotor.

The present disclosure is directed to providing a motor for a laundry apparatus in which an inclined surface is formed at an upper end of a blade to guide a flow of air toward a coil when the blade rotates, in an outer rotor type motor having an outer rotor.

The present disclosure is directed to providing a motor for a laundry apparatus in which a width of one end portion of a hole close to a coil is greater than a width of the other end portion of a hole close to a center of a rotor frame so that an air intake volume is increased and a constant distance between the holes is maintained, in an outer rotor type motor having an outer rotor.

The objectives of the present disclosure are not limited to the above-mentioned objectives, and the other objectives and advantages of the present disclosure which are not mentioned may be understood through the description below and will be more clearly understood by embodiments of the present disclosure. In addition, it may be easy to see that the objectives and the advantages of present disclosure may be realized by the means defined in the claims and their combinations.

According to one aspect of the present disclosure, in an outer rotor type motor having an outer rotor, a motor for a laundry apparatus in which a blade having a predetermined height is formed in a lower portion of a rotor frame so as not to affect a winding space of a coil can be provided. Accordingly, the heat dissipation performance of the motor can be improved while improving the output and efficiency of the motor by increasing a volume of the coil.

According to another aspect of the present disclosure, blades can be arranged to be biased on one side of the air inlet in consideration of the rotation direction of the rotor to provide a motor for a laundry apparatus in which air suctioned by a vortex generated during rotation of the blades can flow toward the coil. Accordingly, the cooling of the coil is easier, which can improve the heat dissipation performance of the motor.

According to still another aspect of the present disclosure, a motor for a laundry apparatus in which an inclined surface is formed at an upper end of a blade to guide a flow of air toward a coil when the blade rotates can be provided. Accordingly, since the coil is easily cooled, the heat dissipation performance of the motor can be improved.

According to yet another aspect of the present disclosure, a motor for a laundry apparatus in which, when compared to a width of one end portion of a hole close to a coil, a width of the other end portion of the hole close to the coil is greater than the width of the one end portion in an air inlet so that an air intake volume of air is increased and a constant distance between holes is maintained. Accordingly, the rigidity of the rotor frame can be secured while improving the heat dissipation performance of the motor.

A motor for a laundry apparatus according to an embodiment of the present disclosure includes a stator and a rotor.

The stator includes a core having an annular shape and a coil wound around the core.

The rotor includes a magnet disposed outside the stator with an air gap interposed therebetween and a rotor frame which fixes the magnet and rotates outside the stator.

In a motor for a laundry apparatus according to an embodiment of the present disclosure, a rotor frame includes a base frame, an extension frame, an air inlet, and a blade.

The base frame refers to a frame having a circular shape which is disposed to face a coil with a distance therebetween.

The extension frame refers to a circular tubular frame which protrudes from an edge of the base frame in a circumferential direction. A plurality of magnets are fixed in an inner circumferential surface of the extension frame. The plurality of magnets may be disposed to surround the inner circumferential surface of the extension frame in the circumferential direction.

The air inlet may be formed to pass through the base frame in a thickness direction, air of the outside of the motor may be suctioned into the motor through the air inlet.

The blade refers to a plate-shaped structure disposed close to the air inlet. The blade may be installed to stand in a direction intersecting one surface of the base frame to protrude to a set height from the base frame.

The blade may be positioned outside a region in which the coil is disposed to face the base frame. In the case of an outer rotor type motor having an outer rotor which is a rotor in which a rotor frame rotates outside a stator, there is a disadvantage that a winding space of a coil is reduced as much as a protruding height of a blade protruding upward from a base frame. Because of this, according to the embodiment of the present disclosure, the blade having a predetermined height can be formed at a position outside the region in which the coil is disposed to face the base frame so as not to affect a winding space of the coil. Accordingly, the winding space of the coil, which is a height space in which the coil is wound inside the motor, may be sufficiently secured so that the output and efficiency of the motor can be improved by increasing a volume of the coil and the heat dissipation performance of the motor can be improved by sufficiently increasing the height of the blade at the same time. In addition, according to the embodiment of the present disclosure, the height of the blade can be sufficiently increased while increasing the volume of the coil without increasing a height of the motor.

The air inlet includes a plurality of holes formed inside the base frame.

In addition, the air inlet includes a plurality of holes formed inside the base frame, and the plurality of holes may be radially arranged in the base frame around a center of the base frame. The plurality of holes may be formed long in a radial direction of the base frame.

The rotor frame may further include a plurality of beads convexly formed on one surface of the base frame, and the plurality of beads may be positioned outside the region in which the coil is disposed to face the base frame.

The plurality of beads refers to a structure which has an uneven shape that reinforces the strength of the rotor frame. In the rotor frame, more specifically, in the base frame constituting the rotor frame and having a circular shape, a phenomenon of distortion or elliptical deformation due to centrifugal force may occur due to high-speed rotation. The plurality of beads reinforce the strength of the base frame to prevent such structural deformation.

Each of the plurality of beads may have a shape convexly protruding in a thickness direction of the base frame, and preferably, the plurality of beads may be positioned outside a space in which the coil is wound, that is, the region in which the coil is disposed to face the base frame. Accordingly, the winding space of the coil can be prevented from being reduced as much as a protruding height of the bead to prevent the volume of the coil from being reduced. As a result, the height space at which the coil is wound inside the motor can be sufficiently secured, and thus the output and efficiency of the motor can be improved by increasing the volume of the coil.

The plurality of beads may be radially arranged on the base frame around the center of the base frame. In addition, the plurality of beads may be formed long in the radial direction of the base frame.

In a motor for a laundry apparatus according to an embodiment of the present disclosure, an air inlet includes a plurality of holes formed inside a base frame. The plurality of holes may be radially arranged in the base frame around a center of the base frame and formed long in a radial direction of the base frame. In this case, each of the plurality of holes may be formed to be spaced a predetermined distance from one of two sides of each of a plurality of beads.

In a motor for a laundry apparatus according to an embodiment of the present disclosure, a rotor frame further includes a plurality of beads convexly formed on one surface of a base frame. In this case, one end portion of each of the plurality of beads may extend to be closer to a center of the base frame in a radial direction of the base frame than an air inlet. The other end portion of each of the plurality of beads may be shorter than a radius of the base frame and thus may be positioned outside a region in which a coil is disposed to face the base frame.

In a motor for a laundry apparatus according to an embodiment of the present disclosure, an air inlet includes a plurality of holes formed inside a base frame. The plurality of holes may be radially arranged in the base frame around a center of the base frame and formed long in a radial direction of the base frame. In this case, a blade may be longitudinally connected to each of the plurality of holes in a longitudinal direction and may have a plate shape protruding to a set height.

A length of the blade may be smaller than a length of each of the plurality of holes.

In a motor for a laundry apparatus according to an embodiment of the present disclosure, an air inlet includes a plurality of holes formed inside a base frame. The plurality of holes may be radially arranged in the base frame around a center of the base frame and may be formed long in a radial direction of the base frame. In this case, a blade may be disposed to be biased to one side of two sides of each of the plurality of holes in a longitudinal direction.

In this case, a biased position of the blade may be determined according to a rotation direction of a rotor. For example, when a rotor frame rotates clockwise, the blade may be aligned to be biased to a left side of the two sides of the hole in the longitudinal direction. Conversely, when the rotor frame rotates counterclockwise, the blade may be aligned to be biased to the right side of the two sides of the hole in the longitudinal direction.

As described above, when the blade is disposed to be biased in one direction with respect to the air inlet, more specifically, to each of the plurality of holes, air suctioned into the motor through the hole is scattered by the blade, and thus a vortex is generated so that a flow of air suctioned through the hole toward a coil can be generated to improve a cooling effect of the motor.

In a motor for a laundry apparatus according to an embodiment of the present disclosure, an air inlet includes a plurality of holes formed inside a base frame. The plurality of holes may be radially arranged in the base frame around a center of the base frame and may be formed long in a radial direction of the base frame. In this case, a blade may be formed so that, when compared to a height of one end portion of the blade close to the center of the base frame, a height of the other end portion of the blade close to a region in which a coil is disposed to face the base frame is greater than the height of the one end portion. In other words, the blade may have a shape in which the height significantly increases toward the coil. Accordingly, since air suctioned into the motor can flow toward the coil along the blade, the coil or core can be easily cooled.

In a motor for a laundry apparatus according to an embodiment of the present disclosure, a rotor frame further includes a plurality of beads convexly formed on one surface of a base frame. In this case, a height of one end portion of a blade may be smaller than a height of each of the plurality of beads, and a height of the other end portion of the blade may be greater than the height of each of the plurality of beads. The other end portion of the blade obliquely protrudes upward to a height greater than each of the height of each of the plurality of beads, and thus a flow direction of suctioned air can be more easily guided toward the coil.

In a motor for a laundry apparatus according to an embodiment of the present disclosure, an inclined surface may be provided at an upper end of a blade. In this case, the inclined surface may be formed so that a height of the blade gradually increases from one end portion of the blade toward the other end portion of the blade. The inclined surface may guide a flow direction of air suctioned through a plurality of holes toward a coil.

In a motor for a laundry apparatus according to an embodiment of the present disclosure, an air inlet includes a plurality of holes formed inside a base frame. The plurality of holes may be radially arranged in the base frame around a center of the base frame and may be formed long in a radial direction of the base frame. In this case, when compared to a width of one end portion of the hole close to the center of the base frame, a width of the other end portion of the hole close to a region in which a coil is disposed to face the base frame may be greater than the width of the one end portion, in each of the plurality of holes.

For example, each of the plurality of holes may have a fan shape in which the width gradually increases from the one end portion of the hole toward the other end of the hole.

As described above, the motor for a laundry apparatus according to the embodiment of the present disclosure, as each of the plurality of holes included in the air inlet has the fan shape in which the width gradually increases from the one end portion of the hole toward the other end portion of the hole, an air intake volume of air can be increased. In addition, a constant distance between the holes can be maintained, so that the strength and rigidity of the base frame can be improved compared to a quadrangular hole in which widths of one end portion and the other end portion of the hole are the same.

In a motor for a laundry apparatus according to an embodiment of the present disclosure, an air inlet includes a plurality of holes formed inside a base frame. The plurality of holes may be radially arranged in the base frame around a center of the base frame and may be formed long in a radial direction of the base frame. In this case, each of the plurality of holes may be positioned outside a region in which a coil is disposed to face the base frame.

The holes may be radially arranged in the base frame and formed long in the radial direction of the base frame, and, for example, the holes may be formed long by extending to the region in which the coil is disposed to face the base frame to correspond to a radius of the base frame. However, when such a long hole is formed, a phenomenon in which air suctioned into the motor through the hole flows along a lower surface of the base frame in an outer circumferential direction occurs, and there is a disadvantage that the air does not flow toward the coil. Accordingly, it is advantageous to form each of the plurality of holes to be shorter than the radius of the base frame so that the hole is positioned outside the region in which a coil is disposed to face the base frame and to be formed longer to correspond to a length of a blade in terms of cooling of the coil.

In addition, a motor for a laundry apparatus according to an embodiment of the present disclosure includes a stator, a rotor, and a driving shaft.

The stator includes a core having an annular shape and a coil wound around to the core. The rotor includes a magnet disposed outside the stator with an air gap interposed therebetween and a rotor frame which fixes the magnet and rotates outside the stator. The driving shaft may receive a rotational force from the rotor frame to rotate.

The rotor frame includes a shaft connecting part, a base frame, an extension frame, an air inlet, and a blade.

The shaft connecting part is connected to the driving shaft.

The base frame may be a circular frame which is disposed to face a coil with a distance therebetween and has a center at which the shaft connecting part is positioned.

The extension frame may be a circular tubular frame which protrudes from an edge of the base frame in a circumferential direction and has an inner circumferential surface to which the magnet is fixed.

The air inlet may be formed to pass through the base frame in a thickness direction, and air outside the motor may be suctioned into the motor through the air inlet.

The blade refers to a plate-shaped structure disposed close to the air inlet. The blade may be installed to stand in a direction intersecting one surface of the base frame to protrude to a set height from the base frame.

The blade may be positioned outside a region in which the coil is disposed to face the base frame. In other words, according to the embodiment of the present disclosure, the blade having a predetermined height may be formed at the position outside the region in which the coil is disposed to face the base frame, so as not to affect a winding space of the coil. Accordingly, a height space in which the coil is wound inside the motor is sufficiently secured, and thus the heat dissipation performance of the motor can be improved by sufficiently increasing the height of the blade while improving the output and efficiency of the motor by increasing a volume of the coil at the same time.

The air inlet includes a plurality of holes formed inside the base frame. The plurality of holes may be radially arranged in the base frame around the center of the base frame and may be formed long in a radial direction of the base frame.

The rotor frame further includes a plurality of beads convexly formed on one surface of the base frame. The plurality of beads may be positioned outside the region in which the coil is disposed to face the base frame.

In addition, the plurality of beads may be radially arranged on the base frame around the center of the base frame and formed long in the radial direction of the base frame.

The shaft connecting part may be positioned on a central stepped part protruding a predetermined height from the base frame. The shaft connecting part further includes a rotor bushing provided in the central stepped part of the base frame. The rotor bushing includes a hub formed of a resin material and a serrated bushing formed of a metal material and insert-injection molded to be positioned at a rotation center of the hub. The rotor bushing may be fastened to the central stepped part of the base frame using a plurality of fastening screws.

One end portion of each of the plurality of beads may be connected to an inclined circumferential surface of the central stepped part to be closer toward the shaft connecting part than the air inlet. The other end portion of each of the plurality of beads may be positioned outside the region in which the coil is disposed to face the base frame.

In addition, in a motor for a laundry apparatus according to an embodiment of the present disclosure, an air inlet includes a plurality of holes formed inside a base frame. The plurality of holes may be radially arranged in the base frame around a center of the base frame and may be formed long in a radial direction of the base frame. In this case, the blade may be longitudinally connected to each of the plurality of holes in a longitudinal direction and may have a plate shape protruding to a set height.

In addition, in a motor for a laundry apparatus according to an embodiment of the present disclosure, an air inlet includes a plurality of holes formed inside a base frame. The plurality of holes may be radially arranged in the base frame around a center of the base frame and may be formed long in a radial direction of the base frame. In this case, a blade may be disposed to be biased to one side of two sides of each of the plurality of holes in a longitudinal direction, and a biased position may be determined according to a rotation direction of a rotor.

In addition, in a motor for a laundry apparatus according to an embodiment of the present disclosure, an air inlet includes a plurality of holes formed inside a base frame. The plurality of holes may be radially arranged in the base frame around a center of the base frame and formed long in a radial direction of the base frame. In this case, an inclined surface may be provided at an upper end of a blade. In this case, in the inclined surface, a height of the blade may gradually increase from one end portion of the blade toward the other end portion of the blade. The inclined surface may guide a flow direction of air suctioned through the plurality of holes toward a coil.

BRIEF DESCRIPTION OF THE DRAWINGS

The above and other objects, features, and advantages of the present disclosure will become more apparent to those of ordinary skill in the art by describing exemplary embodiments thereof in detail with reference to the accompanying drawings, in which.

DETAILED DESCRIPTION

Figure 1:
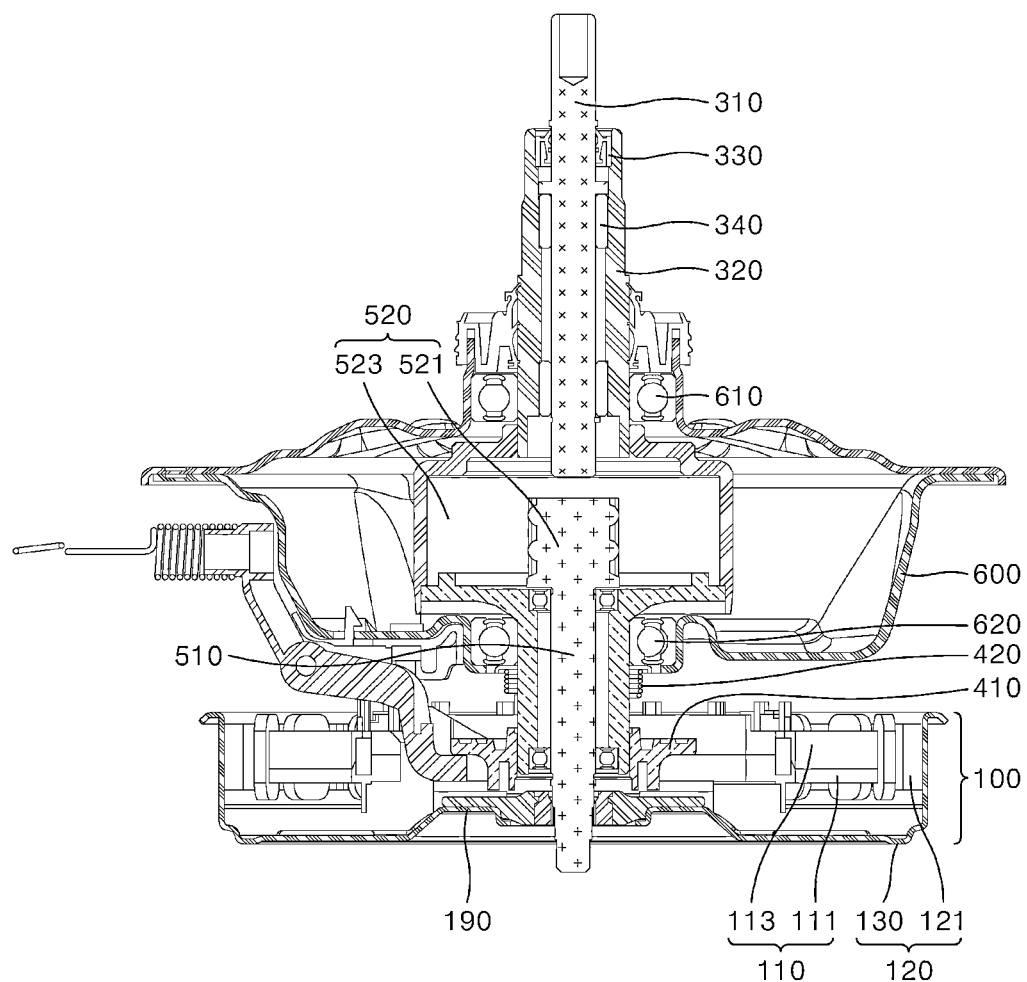
FIG. 1 is a cross-sectional view illustrating the overall structure of a driving apparatus for a laundry apparatus according to one embodiment of the present disclosure.

The above-described purposes, features, and advantages will be described in detail with reference to the accompanying drawings, and thus the technical spirit of the present disclosure may be easily implemented by those skilled in the art. In describing the present disclosure, detailed descriptions of well-known technologies related to the present disclosure that unnecessarily obscure the gist of the disclosure will be omitted. Hereinafter, exemplary embodiments of the present disclosure will be described in detail with reference to the accompanying drawings. The same element or similar elements are denoted by the same reference numerals in the drawings.

Although terms such as first, second, or the like are used for describing various elements, the elements are not limited by the terms. The terms are only used to distinguish one element from another element, and unless otherwise specifically described, a first element may also be a second element.

Throughout the specification, unless specifically described otherwise, each element may be singular or a plurality.

Hereinafter, a case in which an arbitrary element is disposed "above (or under)" or "on (or below)" an element may include a case in which the arbitrary element is disposed to be in contact with an upper (or lower) surface of the element or a case in which still another element may be interposed between the element and the arbitrary element disposed above (or under) the element.

It should be understood that, when an element is referred to as being "connected or coupled" to another element, the element may be directly connected or coupled to another element, still another element may be interposed therebetween, or the elements may be connected or coupled through still another element.

The singular forms used in the present specification are intended to include the plural forms as well, unless the context clearly indicates otherwise. It should be interpreted that the term "comprise" or "include," when used herein, does not necessarily indicate the inclusion of all components or various operations stated in the specification, and some components and operations described therewith may be omitted or further additional components and operations may be included.

Throughout the specification, unless otherwise specifically described, "A and/or B" means "A," "B," or "A and B," and "C to D" means "more than or equal to C and less than or equal to D."

[Overall Structure of Driving Apparatus for Laundry Apparatus to which Motor for Laundry Apparatus is Applied]

Hereinafter, the overall structure of a driving apparatus for a laundry apparatus to which a motor for a laundry apparatus according to an embodiment of the present disclosure is applied will be described with reference to the accompanying drawings.

FIG. 1 is a cross-sectional view illustrating an overall structure of a driving apparatus for a laundry apparatus according to one embodiment of the present disclosure.

A driving apparatus 1000 for a laundry apparatus includes a motor 100 for a laundry apparatus, a shaft connecting part 190, a clutch 410, an inner shaft 310, an outer shaft 320, a gear 520, a bearing housing 600, and first and second bearings 610 and 620.

The driving apparatus 1000 for a laundry apparatus may further include various specific components which are generally usable in a washer, a dryer, or the like, in addition to the above components.

The motor 100 for a laundry apparatus includes a stator 110 and a rotor 120.

The stator 110 includes a stator core 111 and a plurality of coils 113.

The rotor 120 includes a plurality of magnets 121 and a rotor frame 130.

The plurality of magnets 121 may be disposed outside of the stator 110 with air gaps interposed therebetween.

The rotor frame 130 refers to a cylindrical frame which fixes the plurality of magnets 121 and rotates outside the stator 110.

A driving shaft 510 is connected to a rotation center of the rotor frame 130.

In addition, a shaft connecting part 190, to which the driving shaft 510 is fastened, may be provided at the rotation center of the rotor frame 130.

For example, the shaft connecting part 190 and the driving shaft 510 may be firmly fastened in a serration manner to transmit a rotational force to each other.

In other words, the driving shaft 510 and the rotor frame 130 may be firmly fastened through a method in which one end portion of the driving shaft 510 is inserted into a hole (that is, a serrated hole) provided in a serrated bushing 1912 of the shaft connecting part 190 positioned at a center of the rotor frame 130. Accordingly, the driving shaft 510 may receive a rotational force of the rotor frame 130 without changing and output a torque necessary for a laundry apparatus.

The shaft connecting part 190 may be fixed to a central stepped part 141 protruding in a stepped shape from a base frame 140 constituting the rotor frame 130.

For example, the shaft connecting part 190 further includes a rotor bushing 191 fixed to the central stepped part 141 of the base frame 140 using a fastening screw 192.

The rotor bushing 191 further includes a hub 1911 and a serrated bushing 1912.

For example, the hub 1911 may be formed of a resin material by injection molding.

The serrated bushing 1912 may be integrally molded with the hub 1911 to be positioned at a rotation center of the hub 1911. As an example, the serrated bushing 1912 may be formed of a metal material having superior rigidity and may be integrally insert-injection-molded into the hub 1911.

A serrated hole may be provided at a center of the serrated bushing 1912, and the driving shaft 510 may be partially inserted into and firmly fastened to the serrated hole.

In addition, a separate clutch bushing may be further provided on the shaft connecting part 190.

The clutch 410 may slide up and down in an axial length direction of the driving shaft 510 by operation of a solenoid 420 to be selectively connected to and released from the clutch bushing so as to adjust the output of a laundry apparatus, that is, a washer or the like.

A rotational force of the motor 100 for a laundry apparatus may be transmitted to the driving shaft 510 through the rotating rotor frame 130 and then output as a predetermined torque through the inner shaft 310 and/or the outer shaft 320.

The inner shaft 310 and the outer shaft 320 may be concentrically installed with the driving shaft 510.

For example, the inner shaft 310 may be coupled to the rotor 120 to receive a rotational force of the motor 100 for a laundry apparatus. In addition, the outer shaft 320 may be formed to have a structure that is selectively connected to the rotor 120.

The clutch 410 may control connection and disconnection between the outer shaft 320 and the rotor 120 through operation of the solenoid 420.

In addition, a seal part 330 may be provided between the inner shaft 310 and the outer shaft 320. The seal part 330 provides a function of sealing a space between the inner shaft 310 and the outer shaft 320.

In addition, an oilless bearing 340 may be further provided between the inner shaft 310 and the outer shaft 320.

Meanwhile, the gear 520 includes a sun gear 521 and a planetary gear 523.

The sun gear 521 is connected to the driving shaft 510 and is configured to be rotatable with the driving shaft 510.

The planetary gear 523 may be disposed to surround an outer side of the sun gear 521 and may be provided as a plurality of planetary gears 523. The planetary gears 523 may receive a rotational force of the sun gear 521 and rotate according to a gear ratio set in correspondence with the sun gear 521.

The bearing housing 600 is disposed under a tub of the laundry apparatus, that is, the washer, is not rotated, and is fixed to the tub without rotating. The bearing housing 600 may have a structure in which an upper end and a lower end are supported by the first bearing 610 and the second bearing 620.

[Motor for Laundry Apparatus]

Hereinafter, a motor for a laundry apparatus according to an embodiment of the present disclosure will be specifically described with reference to the accompanying drawings.

Figure 2:
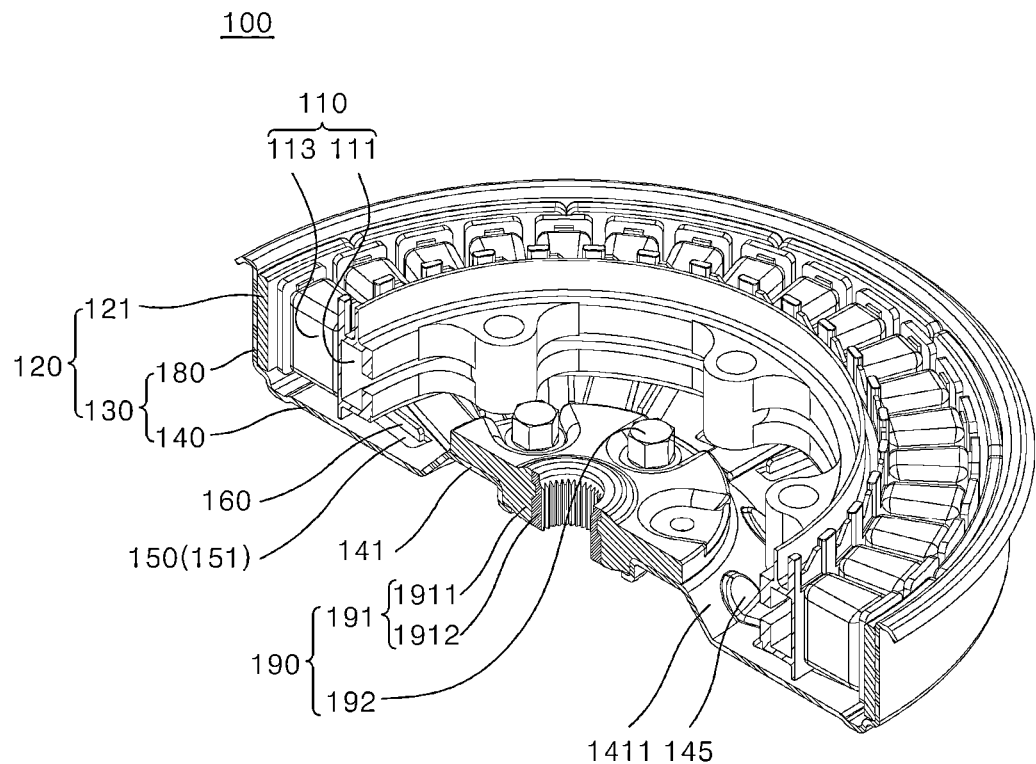
FIG. 2 is a half-cross-sectional perspective view illustrating a motor for a laundry apparatus according to one embodiment of the present disclosure.

FIG. 2 is a half-cross-sectional perspective view illustrating a motor for a laundry apparatus according to an embodiment of the present disclosure, and FIGS. 3 to 21 are drawings illustrating rotor frames which are included in motors for a laundry apparatus according to various embodiments of the present disclosure.

Referring to FIG. 2, a motor 100 for a laundry apparatus includes a stator 110 and a rotor 120.

The stator 110 includes a stator core 111 and a plurality of coils 113.

The stator core (hereinafter, core) 111 may have an annular shape. For example, the core 111 may be formed in an annular structure surrounding a driving shaft 510 (see FIG. 1) with the driving shaft 510 as a center. In addition, the core 111 is positioned inside the rotor 120.

The coils 113 are wound and mounted on the core 111, and the plurality of coils 113 may be mounted on the annular-shaped core 111 at predetermined intervals in a circumferential direction.

The output or efficiency of the motor may be improved according to a volume in which each coil 113 is wound. Accordingly, it is good to secure a sufficient winding space of the coils 113.

The rotor 120 includes a plurality of magnets 121 and a rotor frame 130.

The plurality of magnets 121 are circularly disposed outside the coils 113, and each of the magnets 121 may be disposed to be spaced apart from the stator 110 with a predetermined air gap interposed therebetween.

The rotor frame 130 is a cylindrical frame in which one surface is open, and the plurality of magnets 121 may be installed and fixed along an inner circumference surface of the rotor frame 130 in the circumferential direction.

The rotor frame 130 may rotate outside the stator 110 by a magnetic force between the plurality of coils 113 and the plurality of magnets 121.

For example, the plurality of magnets 121 are mounted and fixed along the inner circumferential surface of the rotor frame 130 in the circumferential direction.

The rotor frame 130 is rotated by an electromagnetic force between the plurality of magnets 121 and the coils 113 of the stator 110. Accordingly, the driving shaft 510 (see FIG. 1) may be fastened to a shaft connecting part 190 (see FIG. 1) positioned at a center of the rotor frame 130 and rotated with the rotor frame 130.

Specifically, the rotor frame 130 includes a base frame 140 and an extension frame 180.

The base frame 140 refers to a circular plate-shaped frame disposed to face the coil 113 with a predetermined distance therebetween in a height direction.

The extension frame 180 refers to a circular tubular frame protruding from an edge of the base frame 140 in the circumferential direction.

The plurality of magnets 121 may be disposed along an inner circumferential surface of the extension frame 180 in the circumferential direction.

The rotor frame 130 is formed to include the circular plate-shaped base frame 140 and the circular tubular extension frame 180, and has a cylindrical inner space corresponding to an area of the base frame 140 and a height of the extension frame 180. In addition, the stator 110 including the core 111 and the plurality of coils 113 may be accommodated in the cylindrical inner space.

A shaft connecting part 190 is a part positioned at a center of the base frame 140 and serration-engaged with the driving shaft 510.

For example, the shaft connecting part 190 may be positioned in a central stepped part 141 protruding in a stepped shape from a central portion of the base frame 140.

The shaft connecting part 190 includes a rotor bushing 191. The rotor bushing 191 is a member coupled to the central stepped part 141 using a plurality of fastening screws 192.

For example, the rotor bushing 191 may include a hub 1911 and a serrated bushing 1912. The hub 1911 is a portion that is injection-molded using a resin material and constitutes the overall body of the rotor bushing 191. Unlike the hub, the serrated bushing 1912 is a part formed of a metal material, is positioned at a rotation center of the hub 1911, and is coupled to the driving shaft 510 (see FIG. 1).

The serrated bushing 1912 may have a structure integrally formed with the hub 1911. For example, the serrated bushing 1912 may be formed of a metal material having superior rigidity and may have a structure integrally manufactured with the hub 1911 by insert-injection molding the serrated bushing 1912 into the hub 1911 when the hub 1911 formed of a resin material is injection-molded.

A serrated hole may be provided at a center of the serrated bushing 1912.

The driving shaft 510 (see FIG. 1) may be partially inserted into and serration-engaged with the hole of the serrated bushing 1912. Accordingly, a rotational force may be transmitted between the driving shaft 510 (see FIG. 1) and the rotor frame 130, and thus a sufficient torque may be output.

In addition, the rotor frame 130 includes an air inlet 150 and a blade 160.

The air inlet 150 may be formed to pass through the base frame 140 in a thickness direction.

The air inlet 150 may be formed to include a plurality of holes 151 and allows air outside the motor to pass through the plurality of holes 151 to be suctioned into the motor. The suctioned air cools the coil (or the core) of the motor to improve the heat dissipation performance of the motor.

The blade 160 may be formed of a thin plate shape disposed close to the air inlet 150.

The blade 160 may be a structure integrally fixed with the rotor frame 130 at a position close to the air inlet 150 and may rotate with the rotor frame 130.

When the blade 160 rotates, air suctioned through the air inlet 150 is forced to rotate and flow by the blade 160, and the heat dissipation performance of the motor can be greatly improved compared to the case in which only the air inlet 150 is provided.

The blade 160 may be integrally fixed to the base frame 140 at a position close to the air inlet 150, may protrude as much as a set height in the shape of a thin plate.

In other words, the blade 160 may have a shape vertically protruding from one surface of the base frame 140 in a direction intersecting the base frame 140.

Meanwhile, the rotor frame 130 further includes a plurality of beads 145. Each of the plurality of beads 145 may have a shape convexly protruding from one surface of the base frame 140.

The plurality of beads 145 refer to a structure which reinforces the strength of the base frame 140 which is rotationally driven. Each of the plurality of beads 145 may have an uneven shape convexly protruding from a surface of the base frame 140.

When the base frame 140 rotates at a high speed, a phenomenon of structural distortion or elliptical deformation may occur due to centrifugal force.

The plurality of beads 145 reinforce the strength of the frame to prevent structural deformation when the base frame 140 is rotationally driven.

The plurality of beads 145 may be formed to extend to an inclined circumferential surface 1411 of the central stepped part 141 formed close to the center of the base frame 140. Accordingly, a reinforcement effect can be improved.

As described above, the motor 100 for a laundry apparatus according to the embodiment of the present disclosure, which is an outer rotor type motor in which a rotor rotates outside a stator, improves heat dissipation performance using the air inlet 150 and the blade 160 while securing the strength of the rotor frame 130.

[Rotor Frame of Motor for Laundry Apparatus According to First Embodiment]

Figure 3:
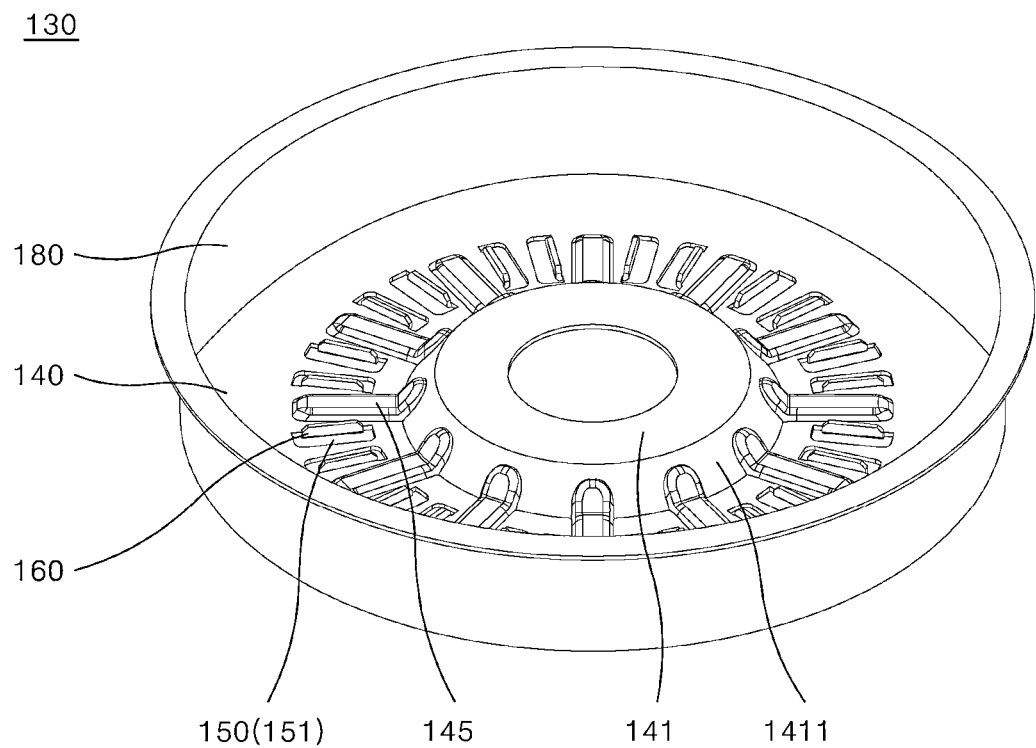
FIG. 3 is a perspective view illustrating a rotor frame of a motor for a laundry apparatus according to a first embodiment of the present disclosure.
Figure 4:
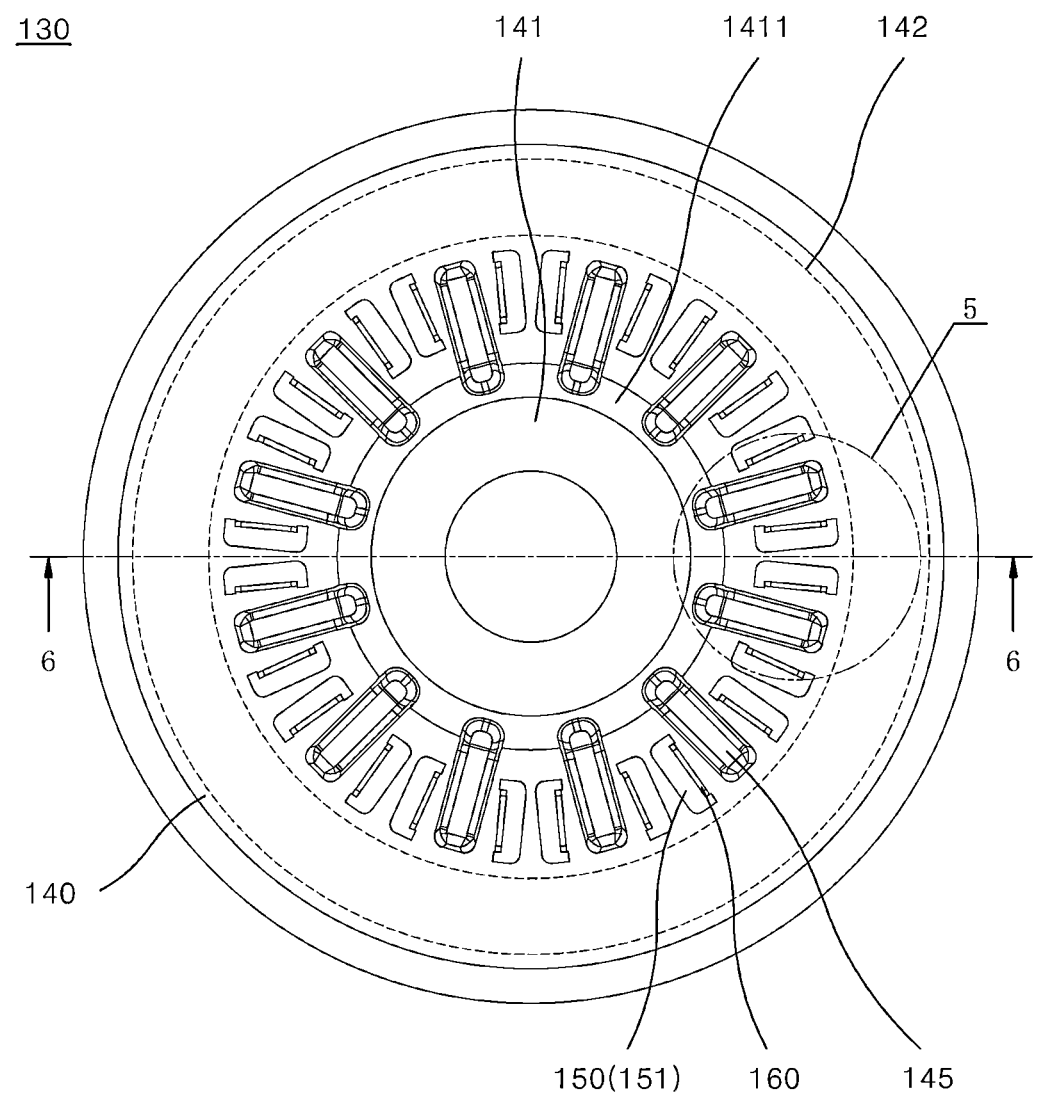
FIG. 4 is a plan view illustrating the rotor frame of the motor for a laundry apparatus according to the first embodiment of the present disclosure.
Figure 5:
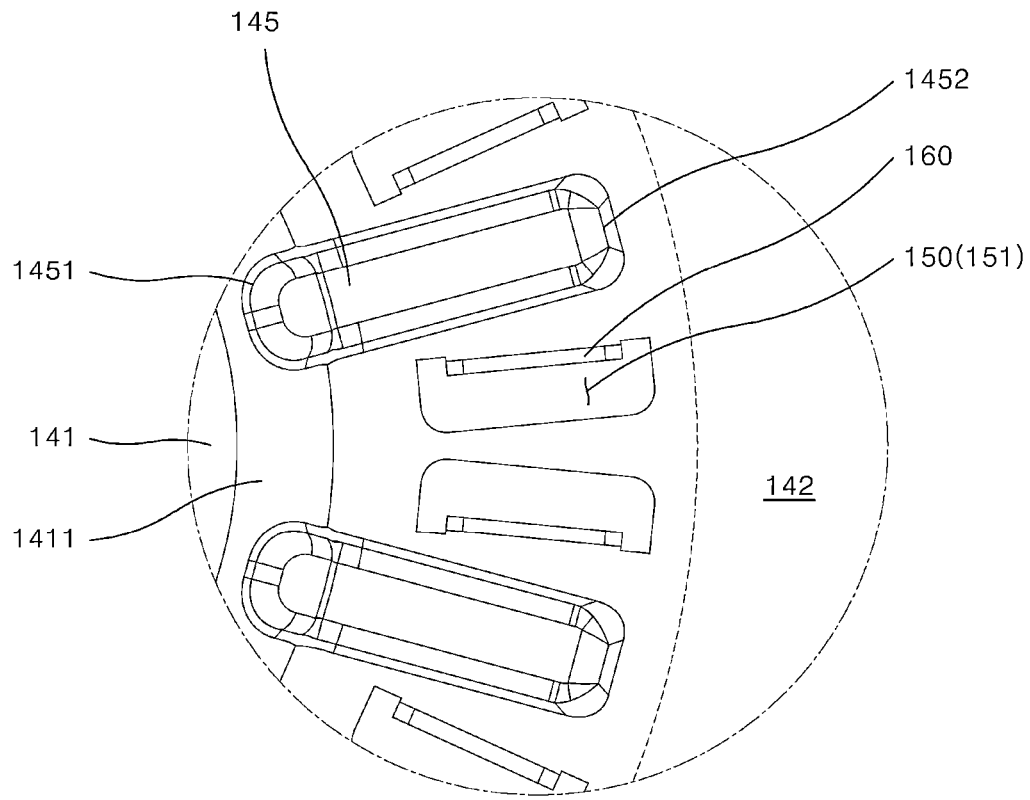
FIG. 5 is an enlarged view illustrating region "5" of FIG. 4.
Figure 6:
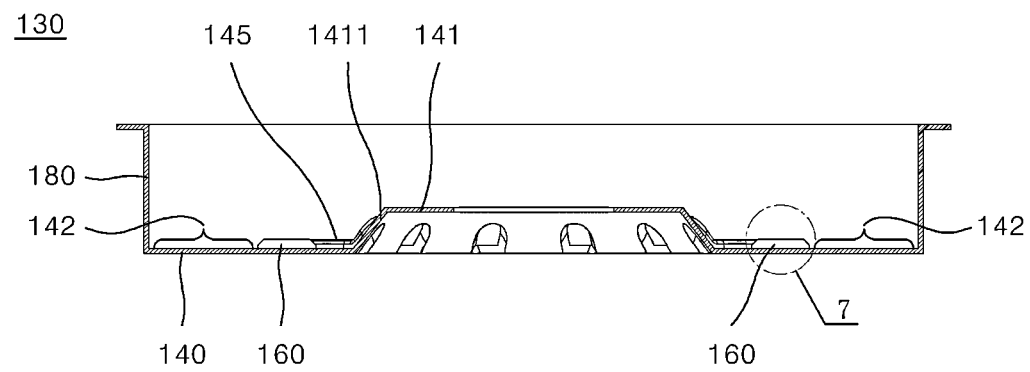
FIG. 6 is a cross-sectional view along line "6-6" of FIG. 4.
Figure 7:
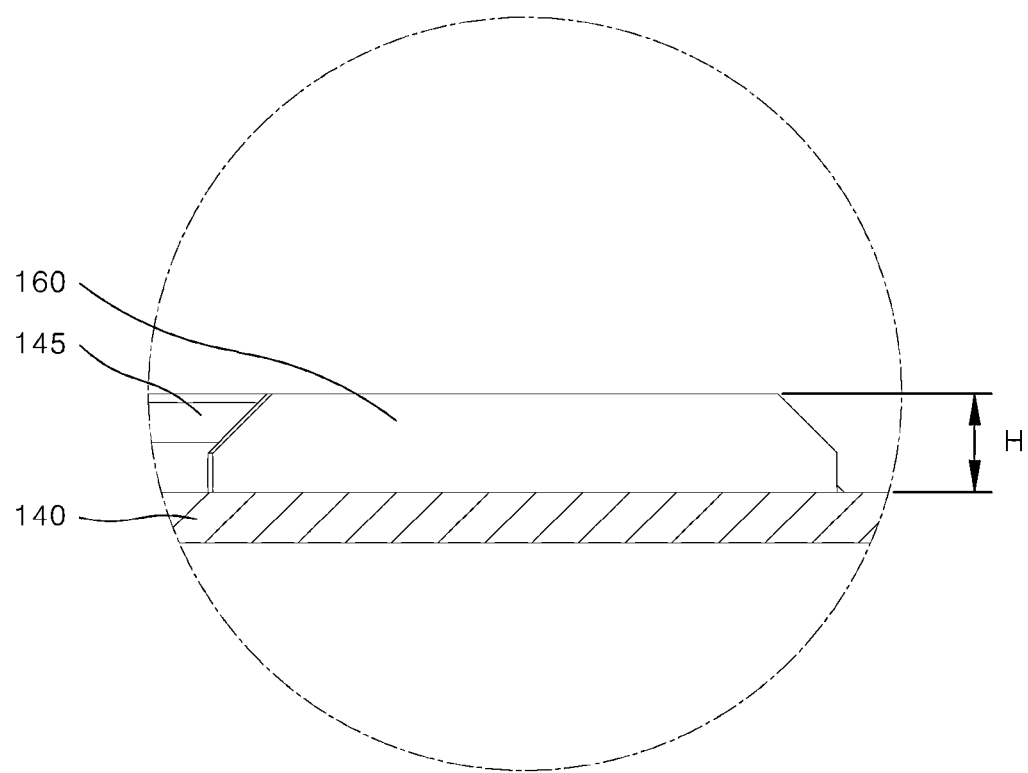
FIG. 7 is an enlarged view illustrating region "7" of FIG. 6.
Figure 8:
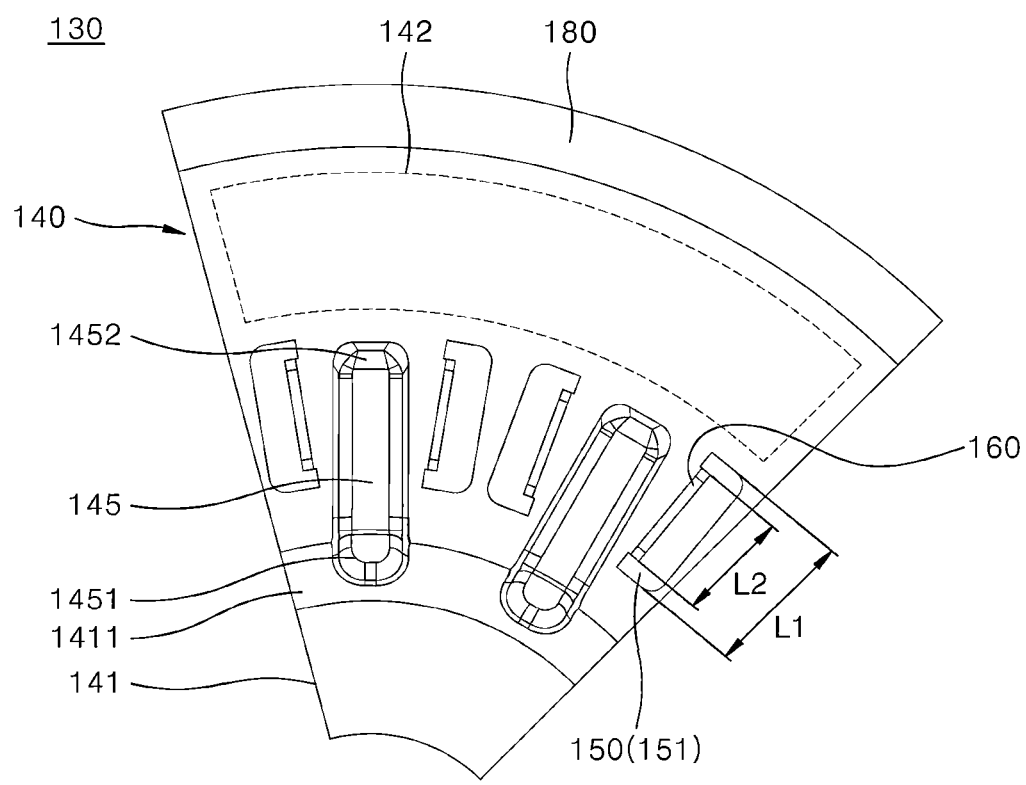
FIG. 8 is a partial view showing a positional relationship between an air inlet, a blade, and a bead in the rotor frame of the motor for a laundry apparatus according to the first embodiment of the present disclosure.
Figure 9:
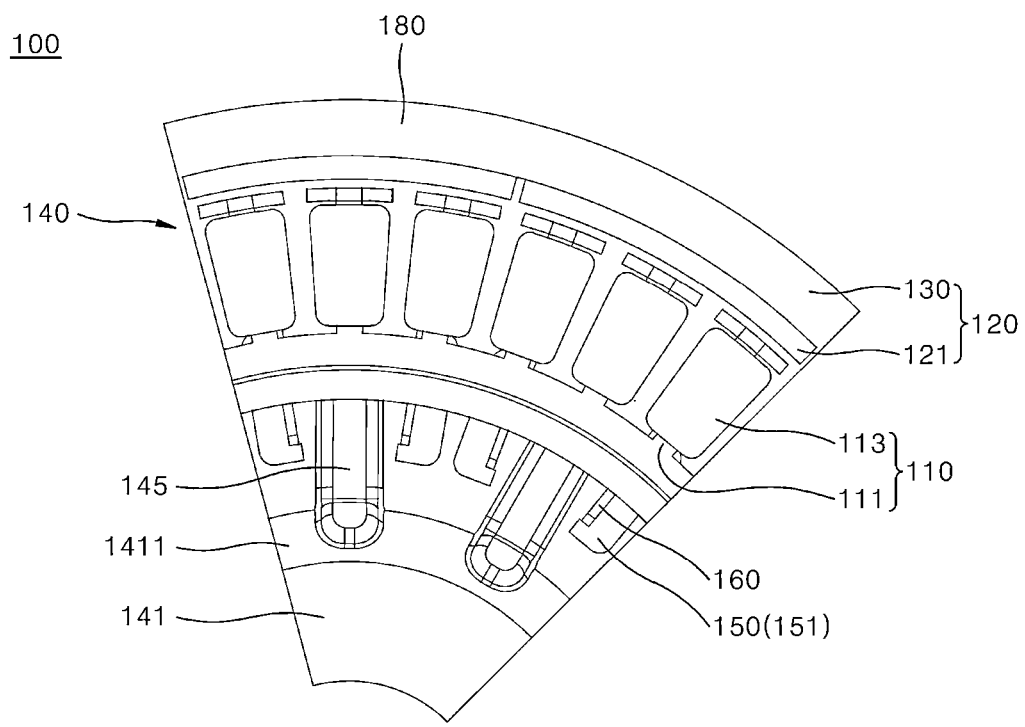
FIG. 9 is a view showing that the air inlet, the blade, and the bead are positioned outside a region in which a coil is wound in the rotor frame of the motor for a laundry apparatus according to the first embodiment of the present disclosure.

FIG. 3 is a perspective view illustrating a rotor frame of a motor for a laundry apparatus according to a first embodiment of the present disclosure, FIG. 4 is a plan view illustrating the rotor frame of the motor for a laundry apparatus according to the first embodiment of the present disclosure. In addition, FIG. 5 is an enlarged view illustrating region "5" of FIG. 4, FIG. 6 is a cross-sectional view along line "6-6" of FIG. 4, and FIG. 7 is an enlarged view illustrating region "7" of FIG. 6. FIG. 8 is a partial view showing a positional relationship between an air inlet, a blade, and a bead in the rotor frame of the motor for a laundry apparatus according to the first embodiment of the present disclosure, and FIG. 9 is a view showing that the air inlet, the blade, and the bead are positioned outside a region in which a coil is wound in the rotor frame of the motor for a laundry apparatus according to the first embodiment of the present disclosure.

As illustrated in the drawings, a rotor frame 130 of the motor for a laundry apparatus according to the first embodiment of the present disclosure refers to a cylindrical frame which fixes a plurality of magnets 121 (see FIG. 2) and rotates outside a stator 110 (see FIG. 2).

The rotor frame 130 includes a base frame 140 and an extension frame 180. The base frame 140 is a circular plate-shaped frame disposed to vertically face coils 113 (see FIG. 2) with a predetermined distance therebetween in a height direction.

The extension frame 180 is a circular tubular frame protruding from an edge of the base frame 140 in a circumferential direction. The plurality of magnets 121 (see FIG. 2) may be fixed to an inner circumferential surface of the extension frame 180.

The base frame 140 and the extension frame 180 are formed to have an integral structure so that the rotor frame 130 has a cylindrical inner space corresponding to an area of the base frame 140 and a height of the extension frame 180.

A central stepped part 141 protruding in a stepped shape having a predetermined height is formed in a central portion of the base frame 140, and an inclined circumferential surface 1411 is formed to be inclined at an outer side of the central stepped part 141.

A shaft connecting part 190 to which a driving shaft 510 is fastened in a serration manner may be fastened and assembled to a center of the central stepped part 141.

In addition, the rotor frame 130 further includes an air inlet 150, a blade 160, and a bead 145.

The air inlet 150 is formed to pass through the base frame 140 in a thickness direction.

As a specific example, the air inlet 150 includes a plurality of holes 151 each having a predetermined length.

Since the plurality of holes 151 are formed to pass through the base frame 140 in the thickness direction, air outside the motor may be introduced, that is, suctioned into the motor, through the plurality of holes 151. The air suctioned through the plurality of holes 151 cools the coil (or core) inside the motor and improves the heat dissipation performance of the motor.

The plurality of holes 151 may be radially disposed inside the base frame 140 about a center of the base frame 140.

Each of the holes 151 may be radially disposed from the center of the base frame 140 and may have a straight hole shape having a predetermined length and formed to extend in a radial direction (see FIG. 4).

The blade 160 rotates with the rotor frame 130 and forces air suctioned through the plurality of holes 151 to flow. Accordingly, there are effects that the core (or coil) is cooled well, and the heat dissipation performance of the motor is improved.

Specifically, the blade 160 may be disposed close to the air inlet 150. This structure is provided so that the blade 160 forces the air suctioned through the air inlet 150, that is, the plurality of holes 151, to rotate.

The blade 160 may have a thin plate shape.

In addition, the blade 160 may protrude from one surface of the base frame 140 as much as a set height.

In this case, since the protruding height of the blade 160 is important in moving air suctioned by a rotational action of the blade 160, it is advantageous to form the height of the blade 160 as large as possible in terms of the heat dissipation of the motor.

As a specific example, the blade 160 may have a shape vertically standing on one surface of the base frame 140.

In particular, according to the embodiment of the present disclosure, the blade 160 may be positioned on the base frame 140 outside a coil arrangement region 142 disposed to face the coil 113 (see FIGS. 2 and 6).

In the case of a motor 100 for a laundry apparatus according to the embodiment of the present disclosure, the motor 100 is an outer rotor type motor in which the rotor frame 130 rotates outside the stator 110 and has a disadvantage that a winding space of the coil 113 is reduced as much as the protruding height of the blade 160.

Accordingly, in the motor 100 for a laundry apparatus, the blade 160 is disposed on the base frame 140 at a position outside the coil arrangement region 142 disposed to vertically face the coil 113 so as not to reduce the winding space of the coil 113 (see FIG. 6).

Accordingly, in the motor 100 for a laundry apparatus, a height space in which the coil 113 is wound may be sufficiently secured, and thus a volume of the coil 113 may be sufficiently increased to improve the output and efficiency of the motor. In addition, as the blade 160 is also disposed at a position outside a position at which the coil 113 is wound, the height of the blade 160 may be sufficiently increased to a required level, and thus there is an advantage that it is advantageous for forcible flowing of suctioned air. As a result, the output and efficiency of the motor can be improved, and at the same time, the heat dissipation performance of the motor can be improved.

In addition, in the case of the motor 100 for a laundry apparatus according to the embodiment of the present disclosure, the volume of the coil 113 and the height of the blade 160 can be sufficiently increased without increasing the overall size of the motor by separating a space in which the coil 113 is wound and a space in which the blade 160 protrudes.

The bead 145 is provided on the base frame 140 to serve to reinforce the strength of the base frame 140.

In the case of the motor 100 for a laundry apparatus according to the embodiment of the present disclosure, the motor 100 is the outer rotor type motor in which the rotor frame 130 rotates outside the stator 110 at a high speed.

When the rotor frame 130 rotates at a high speed, a phenomenon of distortion or elliptical deformation of the rotor frame 130 may occur due to the centrifugal force generated during rotation.

The bead 145 provides a function of improving and reinforcing the structural strength of the base frame 140 to prevent the structural deformation of the base frame 140 due to high-speed rotation.

The bead 145 may be provided as a plurality of beads 145 on the base frame 140.

Each of the plurality of beads 145 may have an uneven shape convexly protruding upward or downward from the inside of the base frame 140.

For example, the plurality of beads 145 may be convexly formed on one surface of the base frame 140 (see FIGS. 3 and 4).

In addition, the plurality of beads 145 may be formed on the base frame 140 at a position outside the coil arrangement region 142.

When the plurality of beads 145 convexly protrude upward in the thickness direction of the base frame 140, as illustrated in FIG. 4, the plurality of beads 145 may be positioned outside the coil arrangement region 142 of the base frame 140.

That is, by separating a region in which the plurality of beads 145 protrude from the region in which the coil is disposed to face in the base frame 140, a decrease in height of the space, in which the coil 113 is wound, due to a protruding height of the bead 145 can be prevented.

As described above, the motor 100 for a laundry apparatus according to the embodiment of the present disclosure may include the plurality of beads 145 to prevent deformation of the base frame 140 and sufficiently secure the winding space of the coil to improve the output and efficiency of the motor at the same time.

Meanwhile, the plurality of beads 145 may be radially arranged on the base frame 140 about the center of the base frame 140.

In addition, the plurality of beads 145 may have a straight protrusion shape having a predetermined length in a radial direction of the base frame 140.

In this case, the plurality of holes 151 may be radially arranged to be spaced a predetermined distance from both sides of each of the plurality of beads 145. For example, a length of each of the plurality of holes 151 formed in the radial direction of the base frame 140 may be smaller than a length of each of the plurality of beads 145. In addition, two holes 151 disposed to be radially spaced a predetermined distance from each other may be formed between two adjacent beads 145. In addition, the plurality of beads 145 and the plurality of holes 151 may be disposed at positions outside the coil arrangement region 142. In other words, the plurality of beads 145 have a shape protruding only at positions outside the coil arrangement region 142, and the plurality of holes 151 have a smaller length than a radius of the base frame 140 and may be formed only up to the positions outside the coil arrangement region 142 (see FIG. 4).

Accordingly, deformation of the base frame 140 due to the beads 145 can be prevented, and air suctioned through the plurality of holes 151 can be forced to flow by the blade 160 to effectively cool the coil positioned in the coil arrangement region 142.

In addition, the bead 145 may be formed to extend so as to be longer than a length of each of the plurality of holes 151 constituting the air inlet 150 in the radial direction of the base frame 140.

For example, one end portion 1451 of each of the plurality of beads 145 may longitudinally extend in the radial direction of the base frame 140 to be closer to the center of the base frame 140 than the holes 151 of the air inlet 150. In addition, the other end portions 1452 of the plurality of beads 145 may be formed at identical or similar positions to the holes 151 of the air inlet 150. In other words, similarly to the holes 151, the other end portions 1452 of the plurality of beads 145 may be formed to be shorter than the radius of the base frame 140 and positioned outside the coil arrangement region 142 (see FIG. 5). Accordingly, deformation can be prevented during high-speed rotation of the base frame 140, an air intake volume of air suctioned through the air inlet 150 may be increased, and thus the heat dissipation performance of the motor can be improved.

Meanwhile, in the motor 100 for a laundry apparatus according to the embodiment of the present disclosure, the blade 160 may be longitudinally connected to each of the plurality of holes 151 in a longitudinal direction (see FIG. 5).

Specifically, the blade 160 may be formed as a radial type.

As an example, the blade 160 may be manufactured by pressing the base frame 140, in this case, when the blade 160 is manufactured to vertically protrude from the base frame 140, manufacturing costs and product defects can be reduced.

The blade 160 is a plate-shaped structure protruding to a height H perpendicularly set from the base frame 140.

In addition, the height H of the blade 160 may be formed to correspond to the height of each of the plurality of beads 145 (see FIG. 7). The height H of the blade 160 may be sufficiently increased to force air suctioned by rotation of the blade 160 to flow so as to effectively cool the coil (or core).

Meanwhile, a length L2 of the blade 160 may be formed to be smaller than a length L1 of each of the plurality of holes 151 (see FIG. 8). Accordingly, the air intake volume of air which passes and is suctioned through the plurality of holes 151 is increased, and suctioned air may be forced to flow by the rotation of the blade 160 so as to cool the coil (or coils).

Referring to FIG. 8, each of the plurality of holes 151 constituting the air inlet 150 at both sides of the plurality of beads 145 may be disposed to have the length L1 in the radial direction. The blade 160 may protrude from the base frame 140 to the set height at a position adjacent to each of the holes 151, and the blade 160 may be disposed to have a length L2 in the longitudinal direction of the hole 151.

In this case, both of the air inlet 150 including the beads 145 and the holes 151 and the blade 160 may be positioned outside the coil arrangement region 142 in which the coil 113 (see FIG. 9) is disposed (see FIG. 9).

Accordingly, the height space in which the coil is wound on the base frame 140 may be sufficiently secured, and thus the output and efficiency of the motor can be improved by increasing the volume of the coil.

In addition, as the blade 160 is positioned outside the region in which the coil 113 is disposed, the height of the blade 160 may be sufficiently increased without constraints according to the volume of the coil to improve the heat dissipation performance of the motor.

In addition, by preventing a reduction in height space in which the coil 113 is wound due to a shape of the convexly protruding bead 145, structural rigidity can be increased, and the output and efficiency of the motor can be improved.

[Rotor Frame of Motor for Laundry Apparatus According to Second Embodiment]

Figure 10:
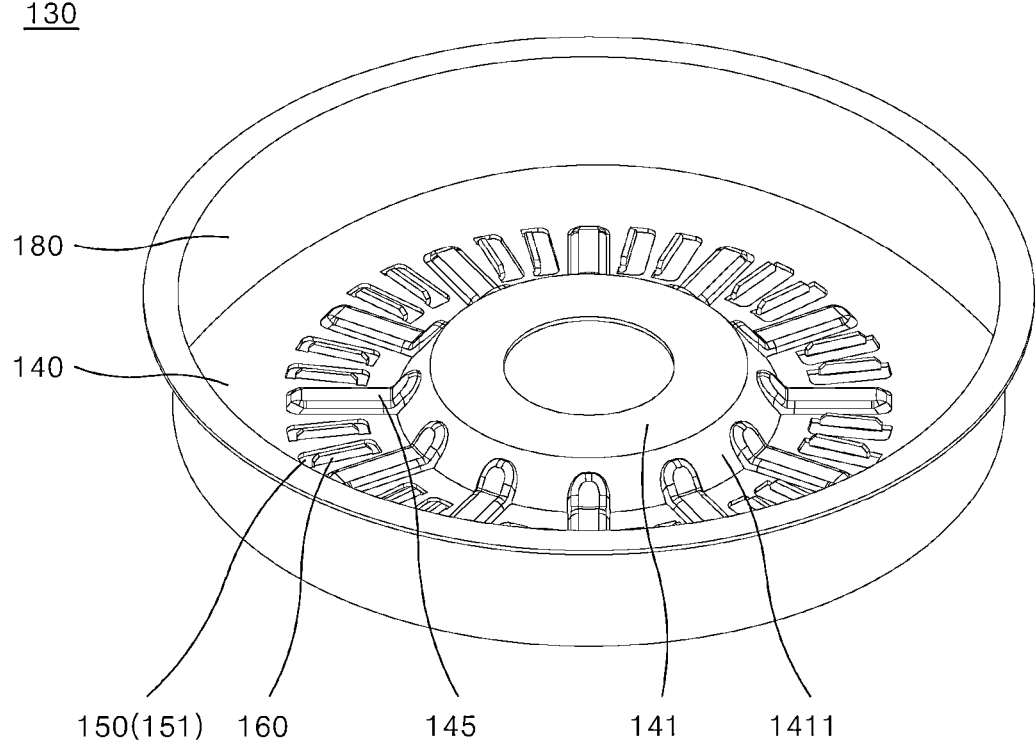
FIG. 10 is a perspective view illustrating a rotor frame of a motor for a laundry apparatus according to a second embodiment of the present disclosure.
Figure 11:
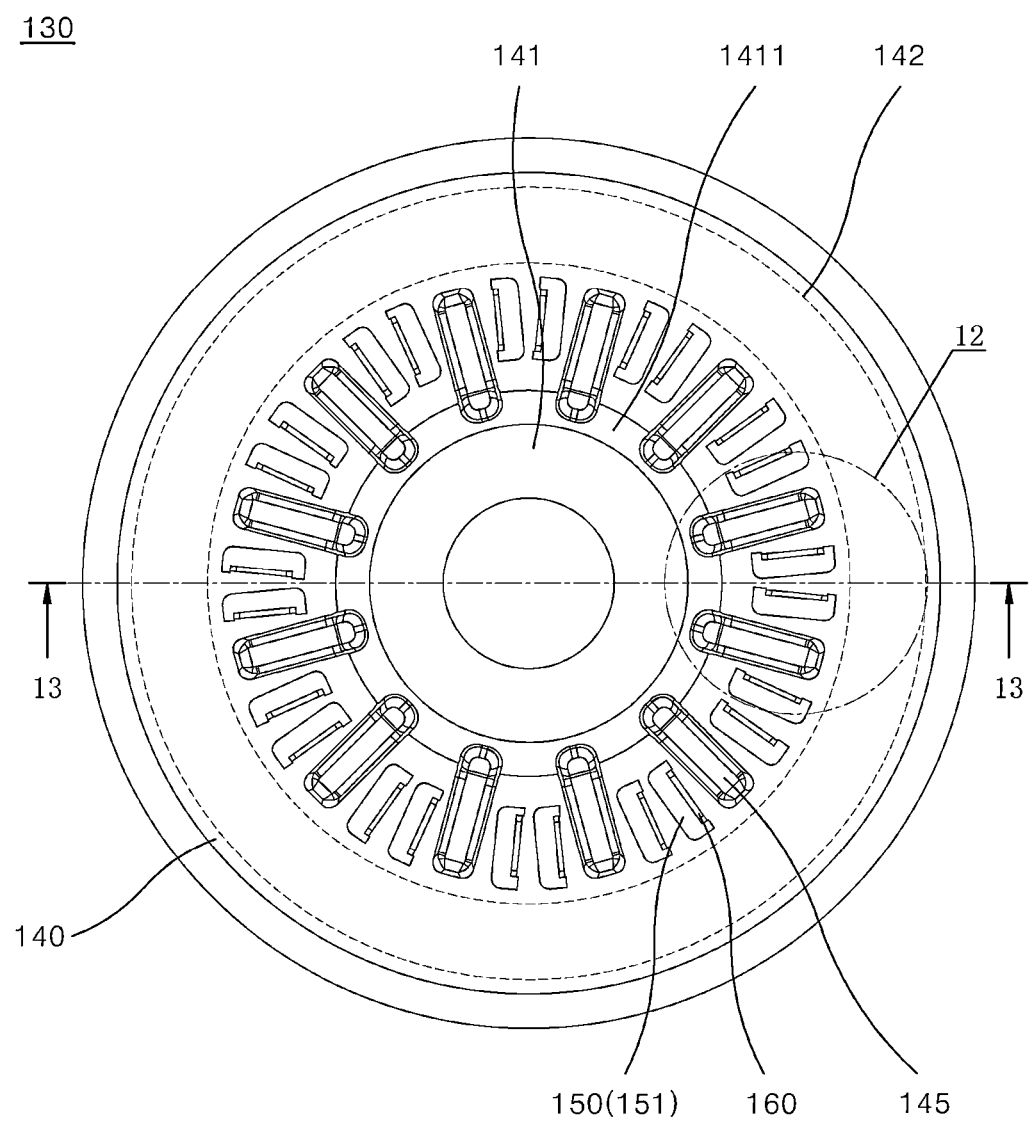
FIG. 11 is a plan view illustrating the rotor frame of the motor for a laundry apparatus according to the second embodiment of the present disclosure.
Figure 12:
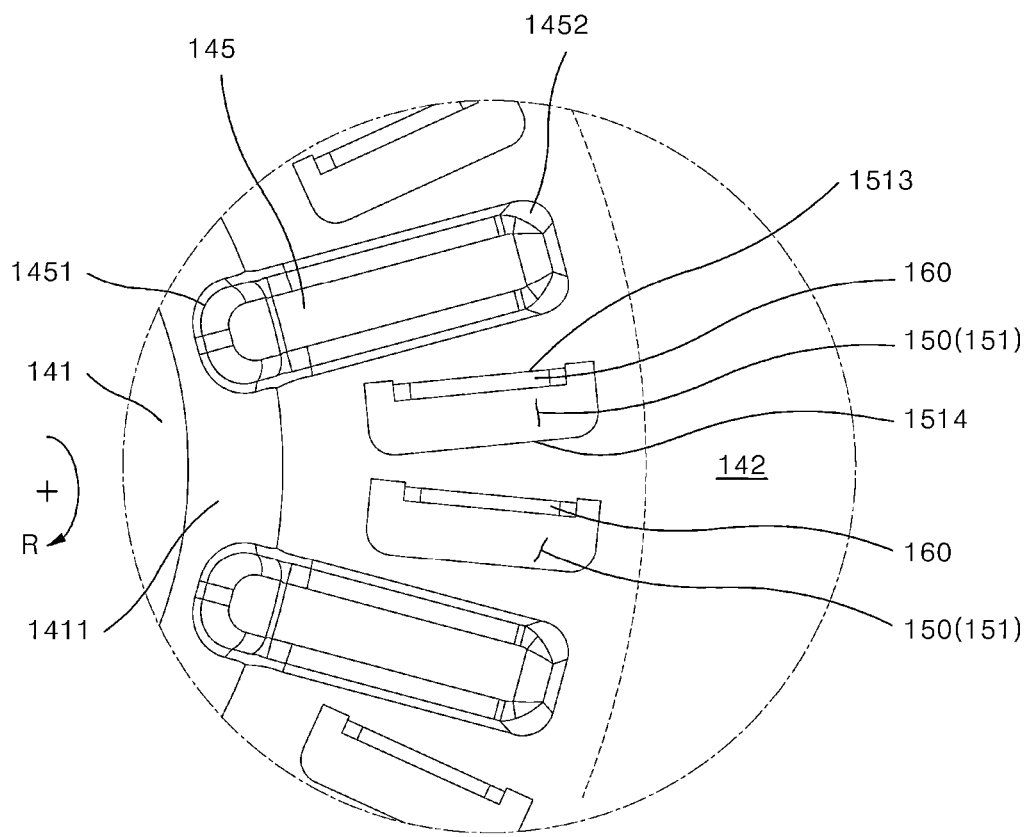
FIG. 12 is an enlarged view illustrating region "12" of FIG. 11.
Figure 13:
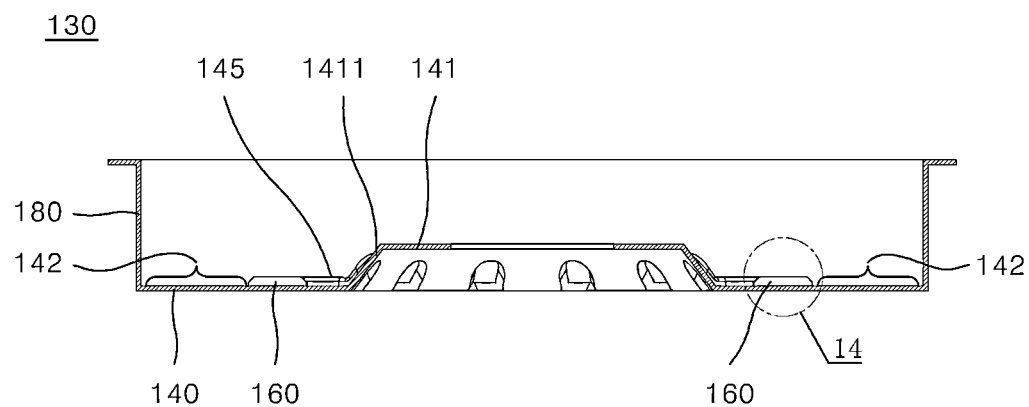
FIG. 13 is a cross-sectional view along line "13-13" of FIG. 11.
Figure 14:
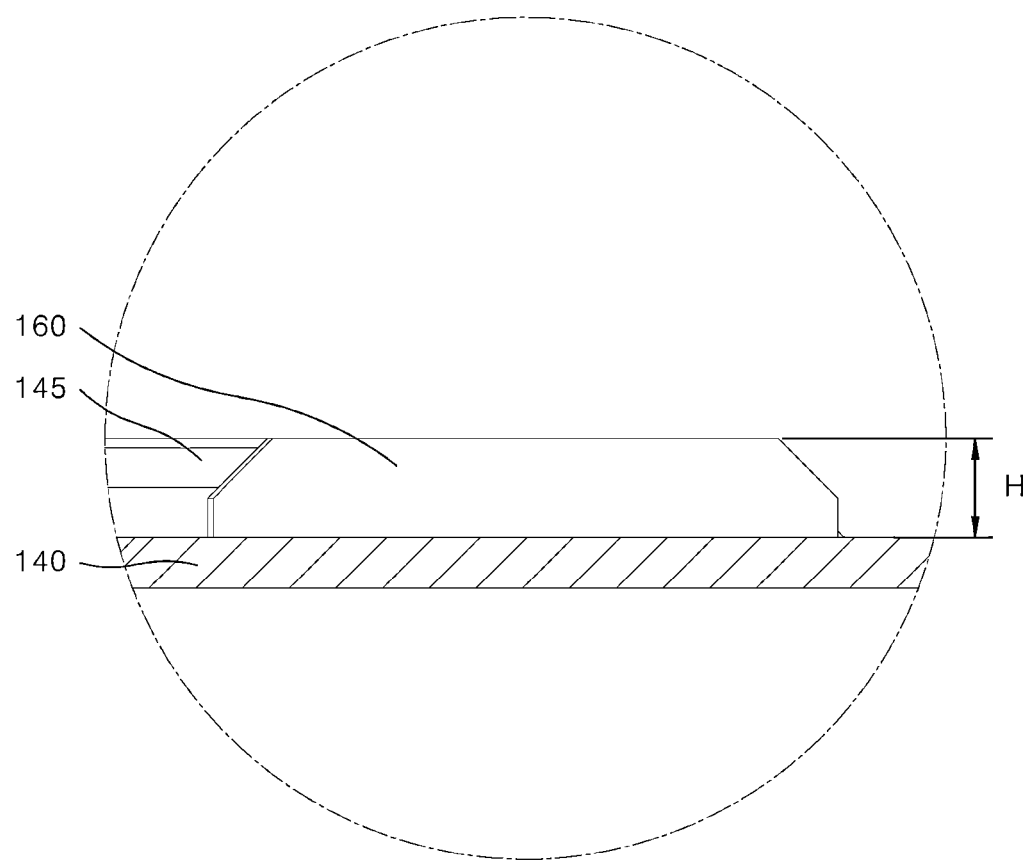
FIG. 14 is an enlarged view illustrating region "14" of FIG. 13.
Figure 15:
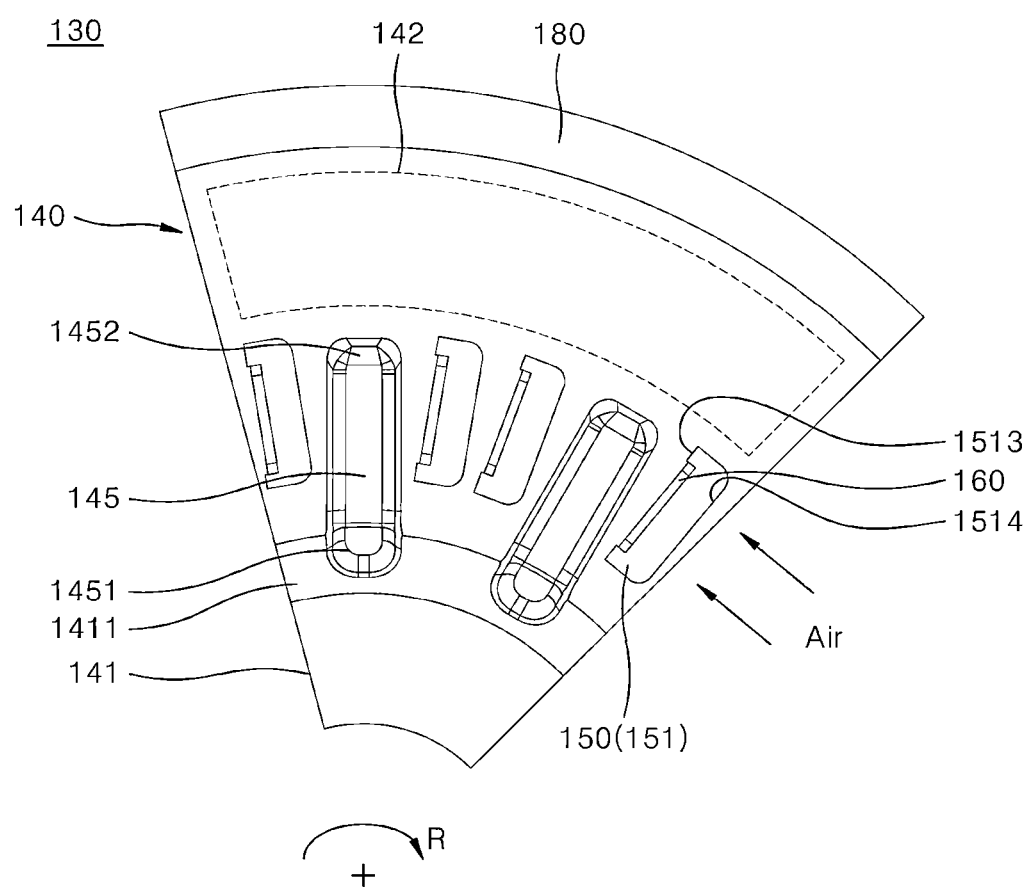
FIG. 15 is a partial view showing a positional relationship between an air inlet, a blade, and a bead in the rotor frame of the motor for a laundry apparatus according to the second embodiment of the present disclosure.
Figure 16:
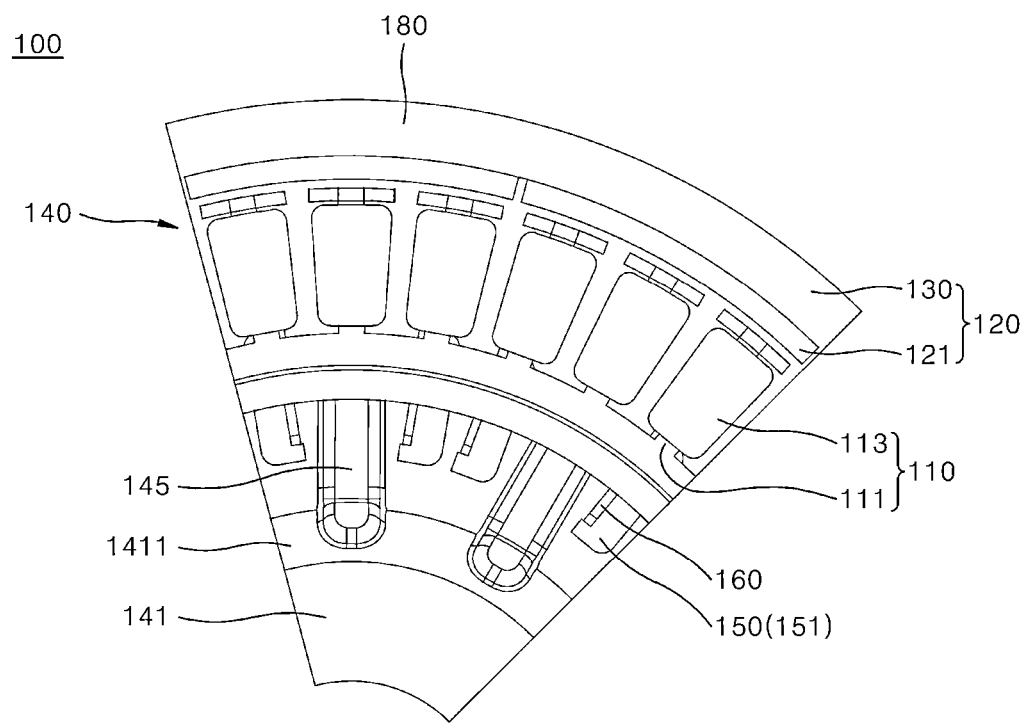
FIG. 16 is a view showing that the air inlet, the blade, and the bead are positioned outside a region in which a coil is wound in the rotor frame of the motor for a laundry apparatus according to the second embodiment of the present disclosure.

FIG. 10 is a perspective view illustrating a rotor frame of a motor for a laundry apparatus according to a second embodiment of the present disclosure, and FIG. 11 is a plan view illustrating the rotor frame of the motor for a laundry apparatus according to the second embodiment of the present disclosure. FIG. 12 is an enlarged view illustrating region "12" of FIG. 11, FIG. 13 is a cross-sectional view along line "13-13" of FIG. 11, and FIG. 14 is an enlarged view illustrating region "14" of FIG. 13. In addition, FIG. 15 is a partial view showing a positional relationship between an air inlet, a blade, and a bead in the rotor frame of the motor for a laundry apparatus according to the second embodiment of the present disclosure, and FIG. 16 is a view showing that the air inlet, the blade, and the bead are positioned outside a region in which a coil is wound in the rotor frame of the motor for a laundry apparatus according to the second embodiment of the present disclosure.

As illustrated in the drawings, a cylindrical rotor frame 130 of the motor for a laundry apparatus according to the second embodiment of the present disclosure refers to a frame which fixes a plurality of magnets 121 (see FIG. 2), and rotates outside a stator 110 (see FIG. 2).

The rotor frame 130 includes a base frame 140 and an extension frame 180. The base frame 140 is a circular plate-shaped frame disposed to vertically face coils 113 (see FIG. 2) with a predetermined distance therebetween in a height direction.

The extension frame 180 is a circular tubular frame protruding from an edge of the base frame 140 in a circumferential direction. The plurality of magnets 121 (see FIG. 2) may be fixed to an inner circumferential surface of the extension frame 180.

The base frame 140 and the extension frame 180 are formed to have an integral structure so that the rotor frame 130 has a cylindrical-shaped inner space corresponding to an area of the base frame 140 and a height of the extension frame 180.

A central stepped part 141 protruding in a stepped shape having a predetermined height is formed in a central portion of the base frame 140, and an inclined circumferential surface 1411 is formed to be inclined at an outer side of the central stepped part 141. A shaft connecting part 190 to which a driving shaft 510 is fastened in a serration manner may be fastened and assembled to a center of the central stepped part 141.

In addition, the rotor frame 130 further includes an air inlet 150, a blade 160, and a bead 145.

The air inlet 150 is formed to pass through the base frame 140 in a thickness direction. The air inlet 150 includes a plurality of holes 151 each having a predetermined length. Since the plurality of holes 151 are formed to pass through the base frame 140 in the thickness direction, air outside the motor may be introduced, that is, suctioned into the motor, through the plurality of holes 151. In addition, the air suctioned through the plurality of holes 151 cools the coil (or core) inside the motor and improves the heat dissipation performance of the motor.

The plurality of holes 151 may be radially disposed inside the base frame 140 about a center of the base frame 140.

Each of the holes 151 may be radially disposed from the center of the base frame 140 and may have a straight hole shape having a predetermined length and formed to extend in a radial direction (see FIG. 11).

The blade 160 rotates with the rotor frame 130 and forces air suctioned through the plurality of holes 151 to flow. Accordingly, there are effects that the core (or coil) is cooled well, and the heat dissipation performance of the motor is improved.

The blade 160 may be disposed close to the air inlet 150. Accordingly, the air suctioned through the air inlet 150, that is, the plurality of holes 151, is forced to flow by rotation of the blade 160 and can improve the heat dissipation effect of the motor.

The blade 160 may have a thin plate shape. In addition, the blade 160 may protrude from one surface of the base frame 140 as much as a set height.

In this case, since the protruding height of the blade 160 is important in moving air suctioned by a rotational action of the blade 160, it is advantageous to form the height of the blade 160 as large as possible in terms of the heat dissipation of the motor.

As a specific example, the blade 160 may have a shape vertically standing on one surface of the base frame 140.

In particular, according to the embodiment of the present disclosure, the blade 160 may be positioned on the base frame 140 outside a coil arrangement region 142 disposed to face the coil 113 (see FIGS. 2 and 13).

In the case of a motor 100 for a laundry apparatus according to the embodiment of the present disclosure, the motor 100 is an outer rotor type motor in which the rotor frame 130 rotates outside the stator 110 and has a disadvantage that a winding space of the coil 113 is reduced as much as the protruding height of the blade 160.

Accordingly, in the motor 100 for a laundry apparatus, the blade 160 is disposed on the base frame 140 at a position outside the coil arrangement region 142 disposed to vertically face the coil 113 so as not to reduce the winding space of the coil 113 (see FIG. 13).

Accordingly, in the motor 100 for a laundry apparatus, a height space in which the coil 113 is wound can be sufficiently secured, and thus a volume of the coil 113 can be sufficiently increased to improve the output and efficiency of the motor. In addition, as the blade 160 is also disposed at a position outside a position at which the coil 113 is wound, the height of the blade 160 can be sufficiently increased to a required level, and thus there is an advantage that it is advantageous for forcible flowing of suctioned air.

The bead 145 is provided on the base frame 140 to serve to reinforce the strength of the base frame 140.

In the case of the motor 100 for a laundry apparatus according to the embodiment of the present disclosure, the motor 100 is the outer rotor type motor in which the rotor frame 130 rotates outside the stator 110 at a high speed. When the rotor frame 130 rotates at a high speed, a phenomenon of distortion or elliptical deformation of the rotor frame 130 may occur due to the centrifugal force generated during rotation.

The bead 145 reinforces the structural strength of the base frame 140 to prevent deformation of the base frame 140 due to high-speed rotation described above.

The bead 145 may be provided as a plurality of beads 145 on the base frame 140. Each of the plurality of beads 145 may have an uneven shape convexly protruding upward or downward from inside the base frame 140. For example, the plurality of beads 145 may be convexly formed on one surface of the base frame 140 (see FIGS. 10 and 11).

Meanwhile, the plurality of beads 145 may be formed on the base frame 140 at a position outside the coil arrangement region 142. When the plurality of beads 145 convexly protrude upward in the thickness direction of the base frame 140, as illustrated in FIG. 11, the plurality of beads 145 may be positioned outside the coil arrangement region 142 of the base frame 140.

As described above, by separating a region in which the plurality of beads 145 convexly protrude from the region in which the coil is disposed to face in the base frame 140, a decrease in height of the space in which the coil 113 is wound due to a protruding shape of the bead 145 is prevented.

As described above, the motor 100 for a laundry apparatus according to the embodiment of the present disclosure may include the plurality of beads 145 to prevent deformation of the base frame 140 and sufficiently secure the winding space of the coil to improve the output and efficiency of the motor at the same time.

The plurality of beads 145 may be radially arranged on the base frame 140 about the center of the base frame 140. In addition, the plurality of beads 145 may have a straight protrusion shape having a predetermined length in the radial direction of the base frame 140.

In this case, the plurality of holes 151 may be radially arranged to be spaced a predetermined distance from both sides of each of the plurality of beads 145. For example, a length of each of the plurality of holes 151 formed in the radial direction of the base frame 140 may be smaller than a length of each of the plurality of beads 145. In addition, two holes 151 disposed to be radially spaced a predetermined distance from each other may be formed between two adjacent beads 145. In addition, the plurality of beads 145 and the plurality of holes 151 may be disposed at positions outside the coil arrangement region 142 (see FIG. 11).

Meanwhile, the bead 145 may be formed to extend so as to be longer than a length of each of the plurality of holes 151 constituting the air inlet 150 in the radial direction of the base frame 140. For example, one end portion 1451 of each of the plurality of beads 145 may longitudinally extend in the radial direction of the base frame 140 to be closer to the center of the base frame 140 than the hole 151 of the air inlet 150.

In addition, the other end portion 1452 of each of the plurality of beads 145 may be formed at identical or similar position to the hole 151 of the air inlet 150.

Similarly to the holes 151, the other end portion 1452 of each of the plurality of beads 145 may be formed to be shorter than a radius of the base frame 140 and positioned outside the coil arrangement region 142 (see FIG. 12). Accordingly, deformation due to the high-speed rotation of the base frame 140 can be prevented by the beads 145 each having a relatively long length, and by forming the holes 151 each having only the required length, the structural strength of the base frame 140 can be secured even while sufficiently suctioning external air.

Meanwhile, in the motor 100 for a laundry apparatus according to the embodiment of the present disclosure, the blade 160 may be longitudinally connected to each of the plurality of holes 151 in a longitudinal direction (see FIG. 12).

Specifically, the blade 160 may be formed as a radial type. For example, the blade 160 may be manufactured by pressing the base frame 140. In this case, when the blade 160 is manufactured to vertically protrude from the base frame 140, manufacturing costs and product defects can be reduced.

The blade 160 is a plate-shaped structure protruding to a height H perpendicularly set from the base frame 140.

In addition, the height H of the blade 160 may be formed to correspond to a height of each of the plurality of beads 145 (see FIG. 14). When the height H of the blade 160 is sufficiently increased, a forcible flow effect of air suctioned by rotation of the blade 160 is improved, and, as a result, a cooling effect of the coil (or core) can be improved.

Meanwhile, the blade 160 may have a smaller length than each of the plurality of holes 151.

In particular, a structure of the rotor frame 130 of the motor for a laundry apparatus according to the second embodiment of the present disclosure has features differentiated from a structure of the rotor frame of the first embodiment described above in terms of a formation position of the blade 160.

Referring to FIGS. 12 and 15, in the case of the rotor frame 130 according to the second embodiment of the present disclosure, the blade 160 is disposed only at one side 1513 of two sides 1513 and 1514 in the longitudinal direction of each of the plurality of holes 151. That is, the blade 160 is disposed to be biased in only one direction with respect to the plurality of holes 151.

In this case, a biased position of the blade 160 may be determined according to the rotation direction of the rotor frame 130.

For example, when the rotor frame 130 rotates clockwise (R), the blade 160 may be disposed at one side 1513 of each of the plurality of holes 151 (see FIG. 15) in the longitudinal direction. Accordingly, air suctioned through the holes 151 may flow in a direction of an arrow of FIG. 15 and may be scattered by the blade 160 disposed at one side 1513 of the hole 151 to generate a vortex. Accordingly, a flow of air may be concentrated toward the coil, and thus the heat dissipation effect of the motor can be improved.

In the opposite case, although not separately illustrated, when the rotor frame 130 rotates counterclockwise, the blade 160 may be disposed at the other side 1514 of each of the plurality of holes 151 in the longitudinal direction.

As described above, in the motor for a laundry apparatus according to the second embodiment of the present disclosure, the blade 160 may be aligned in only one direction at one side 1513 or the other side 1514 of the hole 151 in the longitudinal direction according to the rotation direction of rotor frame 130.

Meanwhile, referring to FIG. 16, the plurality of beads 145, the air inlet 150 including the plurality of holes 151, and the blade 160 may be formed outside the region in which the coils 113 are disposed. Accordingly, the height space in which the coils are wound may be sufficiently secured, and thus the output and efficiency of the motor can be improved by increasing the volume of the coil.

In addition, since the blade 160 is positioned outside the region in which the coil 113 is disposed, the height of the blade 160 may be sufficiently increased, and the heat dissipation performance of the motor can be improved.

In addition, by preventing a reduction in height space in which the coil 113 is wound due to the shape of the convexly protruding bead 145, structural rigidity can be improved, and the output and efficiency of the motor can be improved.

[Rotor Frame of Motor for Laundry Apparatus According to Third Embodiment]

Figure 17:
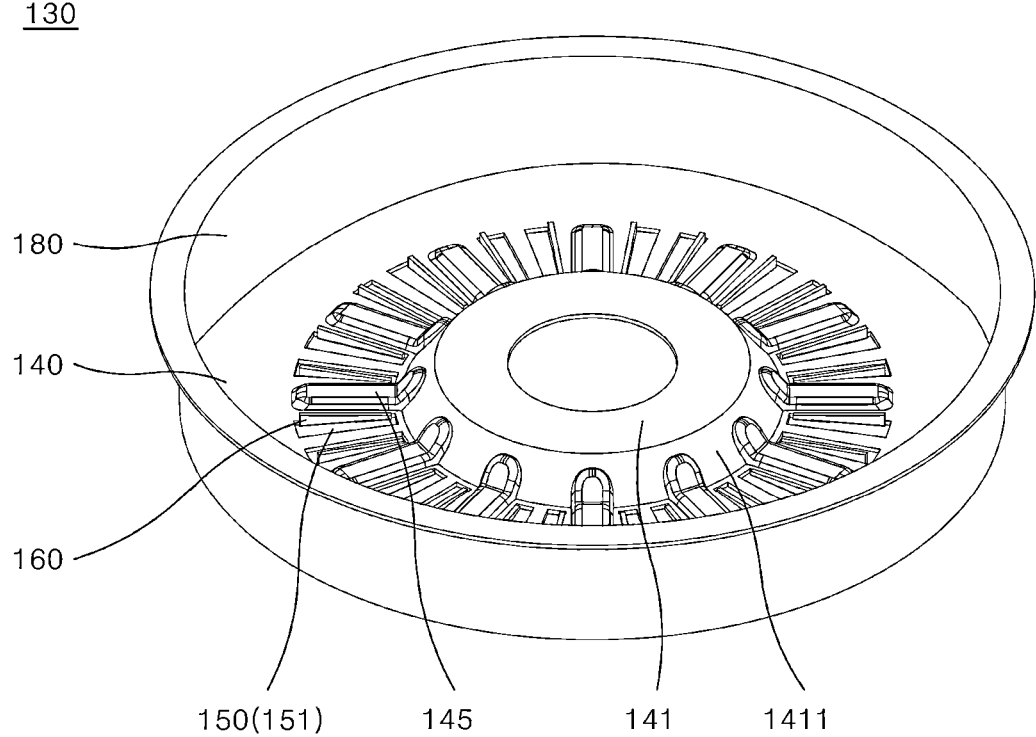
FIG. 17 is a perspective view illustrating a rotor frame of a motor for a laundry apparatus according to a third embodiment of the present disclosure.
Figure 18:
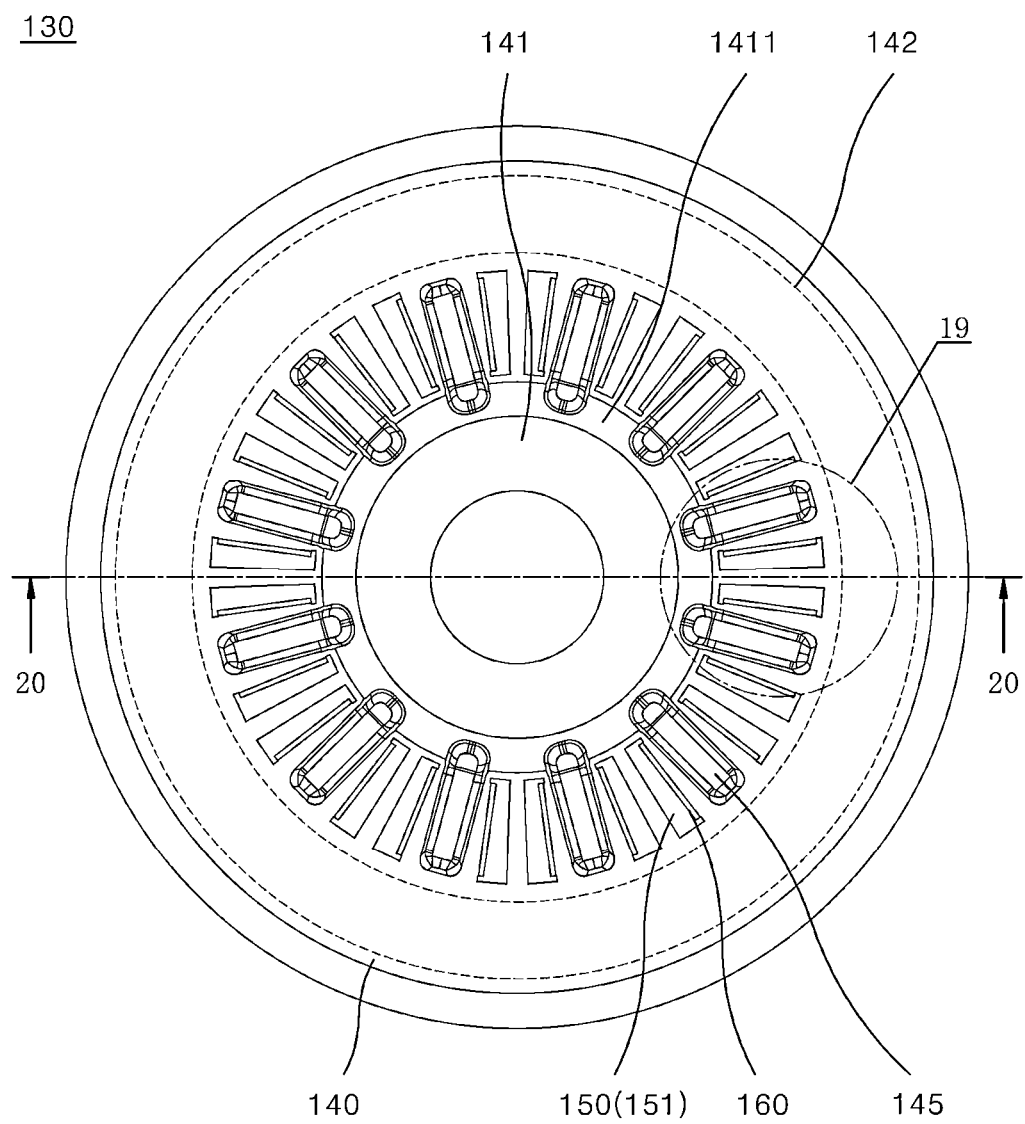
FIG. 18 is a plan view illustrating the rotor frame of the motor for a laundry apparatus according to the third embodiment of the present disclosure.
Figure 19:
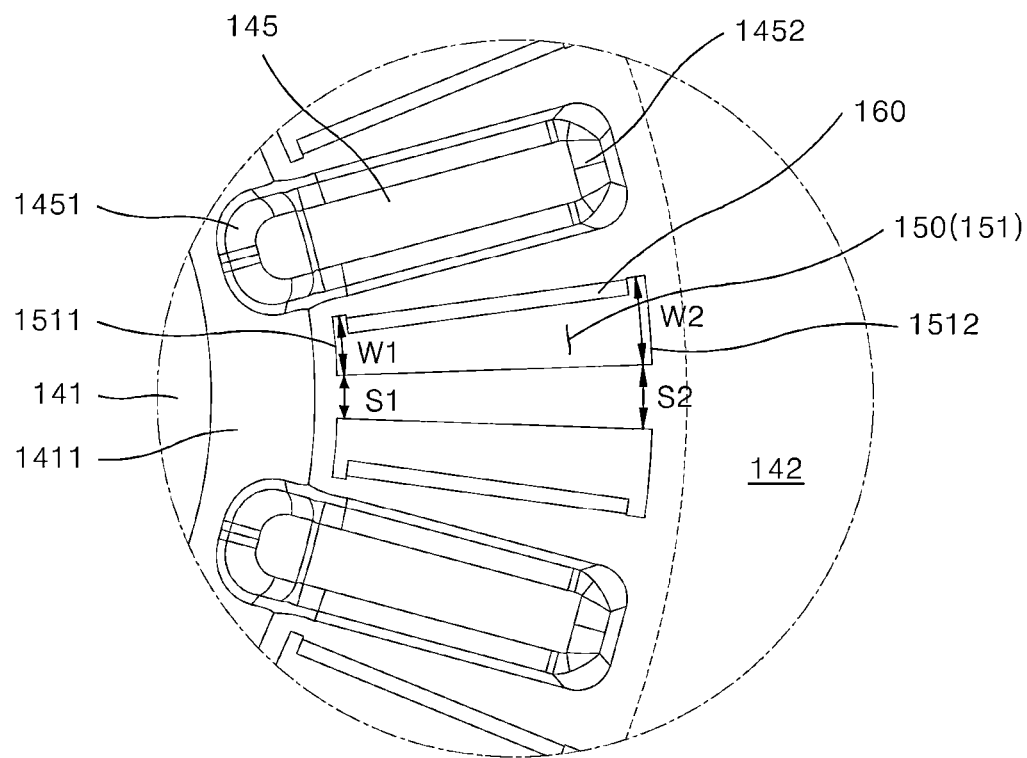
FIG. 19 is an enlarged view illustrating region "19" of FIG. 18.
Figure 20:
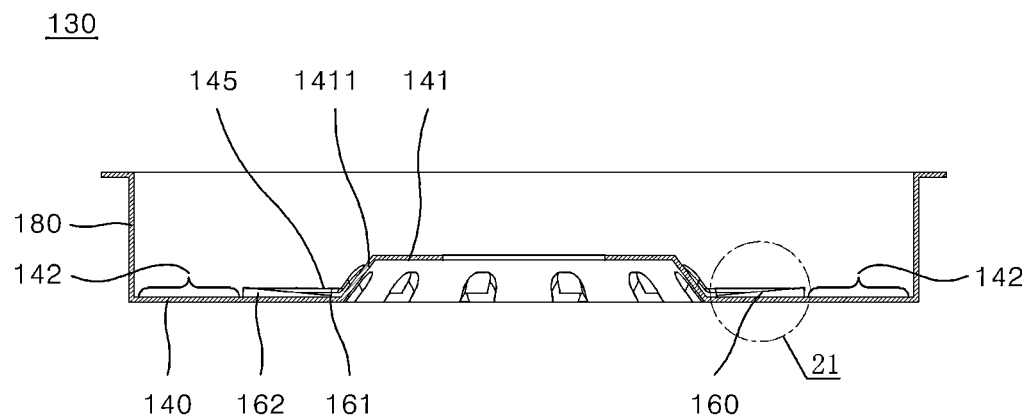
FIG. 20 is a cross-sectional view along line "20-20" of FIG. 18.
Figure 21:
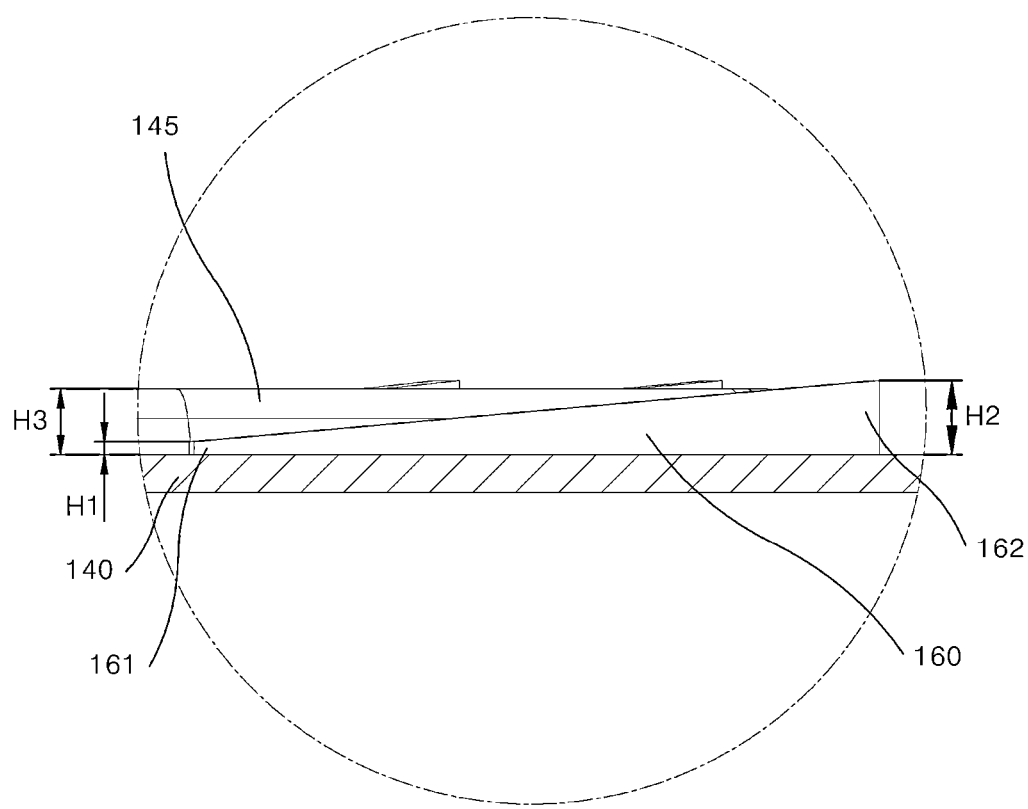
FIG. 21 is an enlarged view illustrating region "21" of FIG. 20.

FIG. 17 is a perspective view illustrating a rotor frame of a motor for a laundry apparatus according to a third embodiment of the present disclosure, and FIG. 18 is a plan view illustrating the rotor frame of the motor for a laundry apparatus according to the third embodiment of the present disclosure. In addition, FIG. 19 is an enlarged view illustrating region "19" of FIG. 18, FIG. 20 is a cross-sectional view along line "20-20" of FIG. 18, and FIG. 21 is an enlarged view illustrating region "21" of FIG. 20.

As illustrated in the drawings, a rotor frame 130 of the motor for a laundry apparatus according to the third embodiment of the present disclosure refers to a cylindrical frame which fixes a plurality of magnets 121 (see FIG. 2) and rotates outside a stator 110 (see FIG. 2).

The rotor frame 130 includes a base frame 140 and an extension frame 180. The base frame 140 is a circular plate-shaped frame disposed to vertically face coils 113 (see FIG. 2) with a predetermined distance therebetween in a height direction.

The extension frame 180 is a circular tubular frame protruding from an edge of the base frame 140 in a circumferential direction. The plurality of magnets 121 (see FIG. 2) may be fixed to an inner circumferential surface of the extension frame 180.

The base frame 140 and the extension frame 180 are formed to have an integral structure so that the rotor frame 130 has a cylindrical-shaped inner space corresponding to an area of the base frame 140 and a height of the extension frame 180.

A central stepped part 141 protruding in a stepped shape having a predetermined height is formed in a central portion of the base frame 140, and an inclined circumferential surface 1411 is formed to be inclined at an outer side of the central stepped part 141. A shaft connecting part 190 to which a driving shaft 510 is fastened in a serration manner may be fastened and assembled to a center of the central stepped part 141.

In addition, the rotor frame 130 further includes an air inlet 150, a blade 160, and a bead 145.

The air inlet 150 is formed to pass through the base frame 140 in a thickness direction. The air inlet 150 includes a plurality of holes 151 each having a predetermined length. Since the plurality of holes 151 are formed to pass through the base frame 140 in the thickness direction, air outside the motor may be introduced, that is, suctioned into the motor, through the plurality of holes 151. In addition, the air suctioned through the plurality of holes 151 cools the coil (or core) inside the motor and improves the heat dissipation performance of the motor.

The plurality of holes 151 may be radially disposed inside the base frame 140 around a center of the base frame 140.

Specifically, each of the holes 151 may be formed to extend to a predetermined length in a radial direction.

Referring to FIG. 19, in each of the plurality of holes 151, when compared to a width W1 of one end portion 1511 of the hole 151 close to the center of the base frame 140, a width W2 of the other end portion 1512 of the hole 151 close to a coil arrangement region 142 may be greater than the width W1.

For example, each of the holes 151 may be formed in a fan shape in which a width size gradually increases from one end portion 1511 toward the other end portion 1512.

As the hole 151 is formed in the fan shape, an air intake volume of air suctioned through the hole 151 may be increased to improve the heat dissipation performance of the motor.

In other words, as the hole 151 has the shape in which the width W2 of the other end portion 1512 close to the coil is relatively large, more suctioned air may be introduced toward the coil. Accordingly, the cooling effect of the coil (or core) can be improved.

In addition, as the hole 151 is formed in the fan shape, a constant distance between the adjacent holes can be maintained to improve the strength and rigidity of the base frame 140.

In other words, when the hole 151 has the fan shape, constant distances S1 and S2 between one end portions 1511 and the other end portions 1512 of the adjacent holes 151 may be maintained, and thus structural strength and rigidity can be improved.

When the hole 151 have the constant width size in a longitudinal direction, the distances between the adjacent holes 151 vary such that the distance between the holes 151 at a particular position becomes smaller, and thus a structurally weak portion may be present (see FIG. 12).

In the case of the rotor frame 130 of the motor for a laundry apparatus according to the third embodiment of the present disclosure, the hole 151 has the fan shape, and the distances S1 and S2 between the adjacent holes 151 at positions of the one end portions 1511 and the other end portions 1512 of the holes 1512 may be maintained the same. In FIGS. 19, since the distances S1 and S2 are the same, a structurally weak portion can be reduced.

The blade 160 rotates with the rotor frame 130 and forces air suctioned through the plurality of holes 151 to flow. Accordingly, there are effects of cooling the core (or coil) well and improving the heat dissipation performance of the motor.

The blade 160 may be disposed close to the air inlet 150. Accordingly, the air suctioned through the air inlet 150, that is the plurality of holes 151, is forced to flow by rotation of the blade 160 and thus the heat dissipation effect of the motor can be improved.

The blade 160 may have a thin plate shape.

In the blade 160, when compared to a height H1 of one end portion 161 of the blade 160, which is a portion close to the base frame 140, a height H2 of the other end portion 162 of the blade 160, which is a portion close to the coil arrangement region 142, may be greater than the height H1 (see FIG. 21).

Referring to FIG. 21, a protruding shape of the blade 160 is formed so that the height H2 of the other end portion 162 is greater than the height H1 of one end portion 161. More specifically, the blade 160 may have an inclined shape in which a height gradually increases from one end portion 161 toward the other end portion 162 of the blade 160.

Accordingly, air suctioned through the hole 151 flows toward the coil along the inclined shape of the blade 160 and can effectively cool the coil (or core).

Due to such a protruding shape of the blade 160, an inclined surface whose height gradually increases from one end portion 161 toward the other end portion 162 may be formed at an upper end of the blade 160.

The inclined surface formed at the upper end of the blade 160 may move air suctioned through the plurality of holes 151 upward in a direction in which the coil is positioned, and thus the cooling effect of the coil (or core) can be improved.

The bead 145 is provided on the base frame 140 to serve to reinforce the strength of the base frame 140. In other words, the bead 145 may prevent deformation of the base frame 140 due to high-speed rotation thereof.

The bead 145 may be provided as a plurality of beads 145 on the base frame 140 and may be convexly formed on one surface of the base frame 140 to have a predetermined height.

For example, the height H1 of one end portion 161 of the blade 160 may be smaller than a height H3 of the bead 145.

In addition, a height of the other end portion 162 of the blade 160 may be greater than the height H3 of the bead 145 (see FIG. 21).

Accordingly, the blade 160 may protrude to a sufficient height to rotate air suctioned through the hole 151 to improve a cooling effect and, in addition, may send the suctioned air toward the coil, and thus the cooling effect of the coil can be maximized.

In addition, when the blade 160 is formed in the inclined shape, interference with other adjacent structures inside the rotor frame 130 may be reduced, a size of the hole 151 and a size of the blade 160 may be significantly increased, and thus the cooling effect can be further improved.

Hereinafter, improvement effects of the heat dissipation performance of the motor for a laundry apparatus according to the embodiment of the present disclosure will be described.

Figure 22:
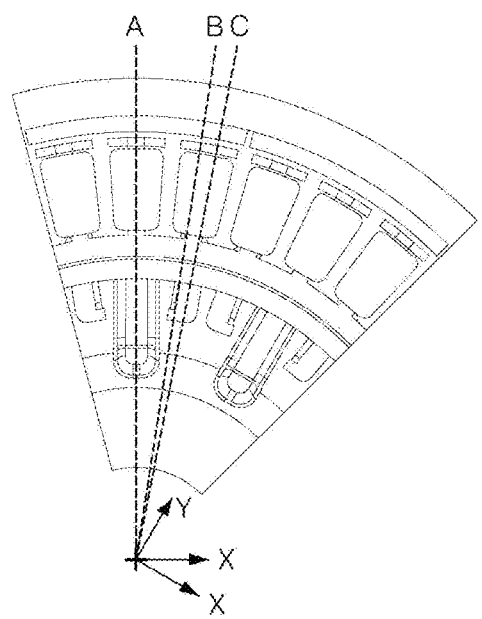
FIG. 22 is a set of analysis result images showing an effect of improving the motor heat dissipation performance of the motor for a laundry apparatus according to the first embodiment of the present disclosure.
Figure 22:
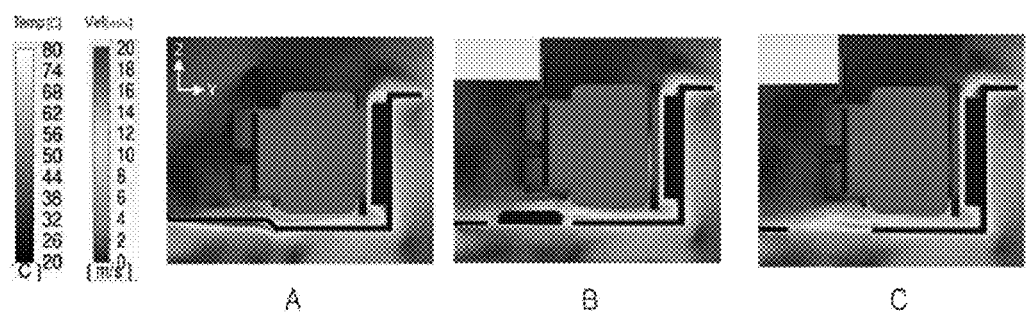

FIG. 22 is a set of heat flow analysis images for describing a motor heat dissipation effect of the motor for a laundry apparatus according to the first embodiment of the present disclosure. In FIG. 22, an image A is a heat flow analysis result around the bead, an image B is a heat flow analysis result around the blade, and an image C is a heat flow analysis result around the hole. Referring to FIG. 22, the blade generates an upward flow of air and generates a flow of the air in the radial direction through rotation thereof. In addition, it can be seen that the air diagonally flows toward the coil around the hole.

Figure 23:
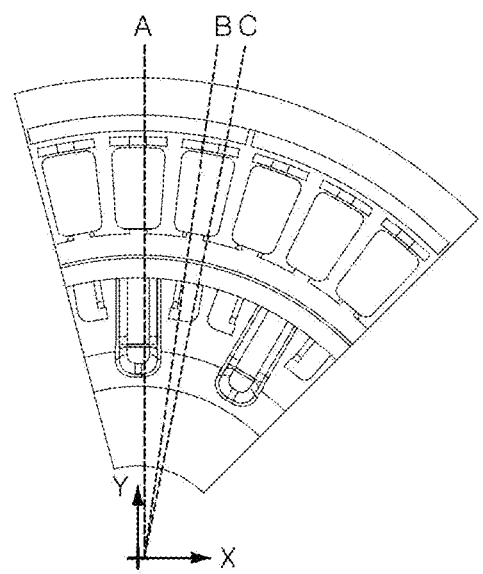
FIG. 23 is a set of analysis result images showing an effect of improving the motor heat dissipation performance of the motor for a laundry apparatus according to the second embodiment of the present disclosure.
Figure 23:
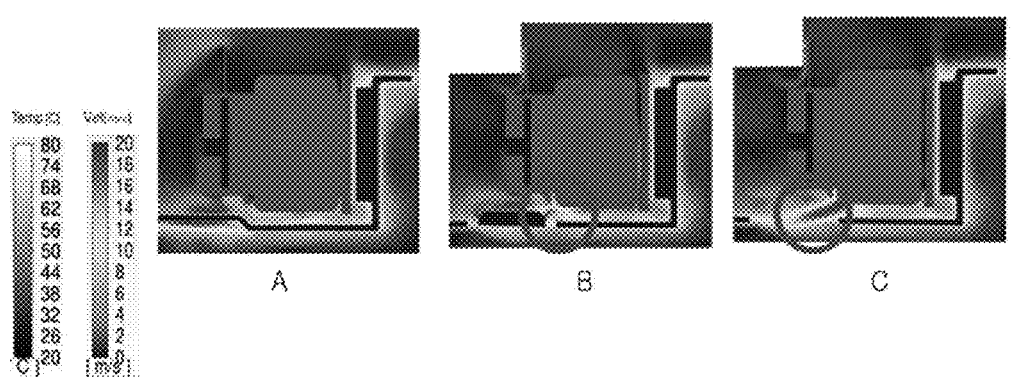

FIG. 23 is a set of analysis result images showing an effect of improving the motor heat dissipation performance of the motor for a laundry apparatus according to the second embodiment of the present disclosure. In FIG. 23, an image A is a heat flow analysis result around the bead, an image B is a heat flow analysis result around the blade, and an image C is a heat flow analysis result around the hole. Referring to FIG. 23, in the structure in which the blade is disposed to be biased to one side in the longitudinal direction of the hole according to a rotation direction of a rotor, when the blade is aligned only in one direction, it can be seen that the blade scatters air after suctioning the air and generates a vortex to further improve a cooling effect. In particular, referring to the images B and C of FIG. 23, it can be seen that air around the blade and the hole flows more intensively toward the coil. Accordingly, the cooling effect of the coil (or core) can be improved, and the heat dissipation performance of the motor can be improved.

Figure 24:
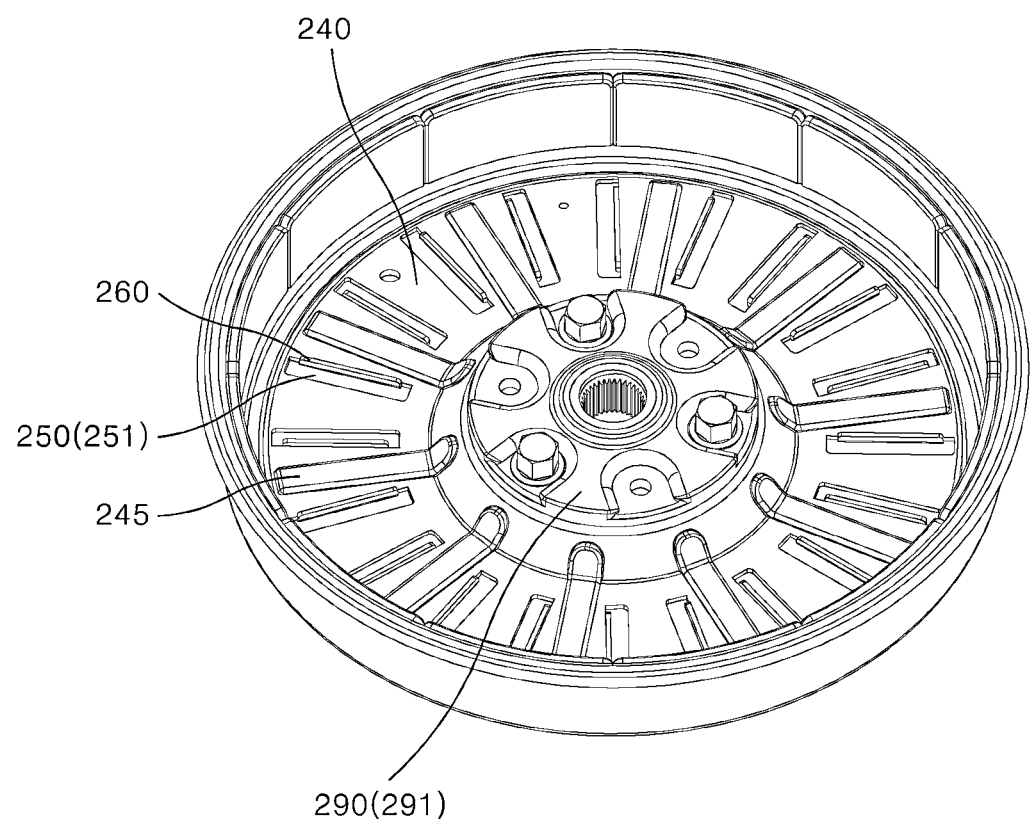
FIG. 24 is a perspective view illustrating a comparative example for comparison with the rotor frames according to the embodiments of the present disclosure.
Figure 25:
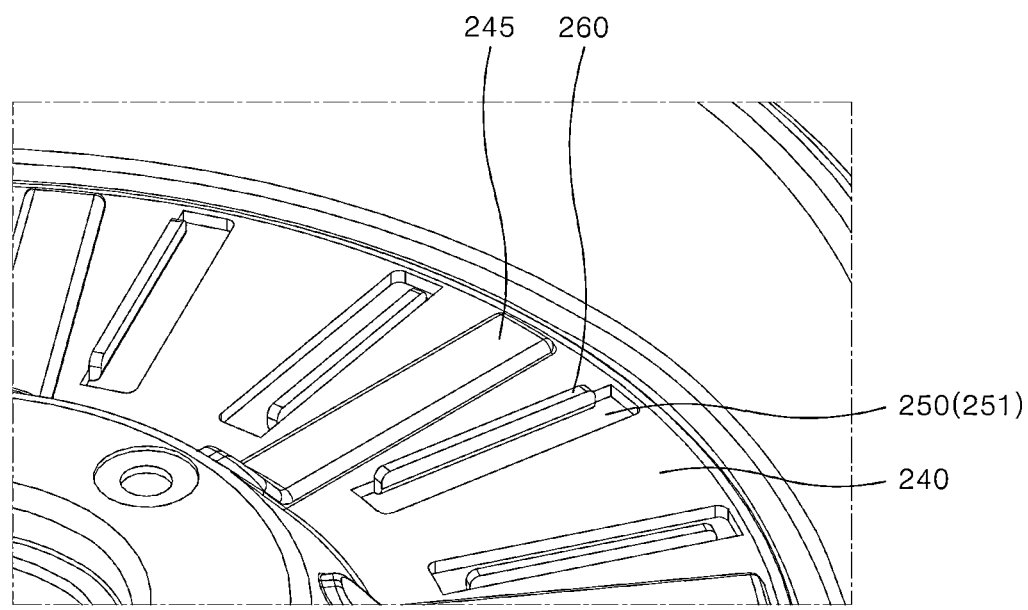
FIG. 25 is an enlarged view illustrating apart of the comparative example illustrated in FIG. 24.

FIG. 24 is a perspective view illustrating a comparative example for comparison with the rotor frames according to the embodiments of the present disclosure, and FIG. 25 is an enlarged view illustrating a part of the comparative example illustrated in FIG. 24.

Referring to FIGS. 24 and 25, a base frame 240 of a rotor frame 230 includes an air inlet 250 including a plurality of holes 251, a blade 260, and a bead 245. In addition, a shaft connecting part 290 is provided at a center of the rotor frame 230, and the shaft connecting part 290 further includes a rotor bushing 291 to which a driving shaft is connected.

In the case of the rotor frame 230 according to the comparative example illustrated in FIGS. 24 and 25, the air inlet 250, the blade 260, and the bead 245 are formed long in a radial direction of the base frame 240, and formed to extend to a coil arrangement region.

Figure 26:
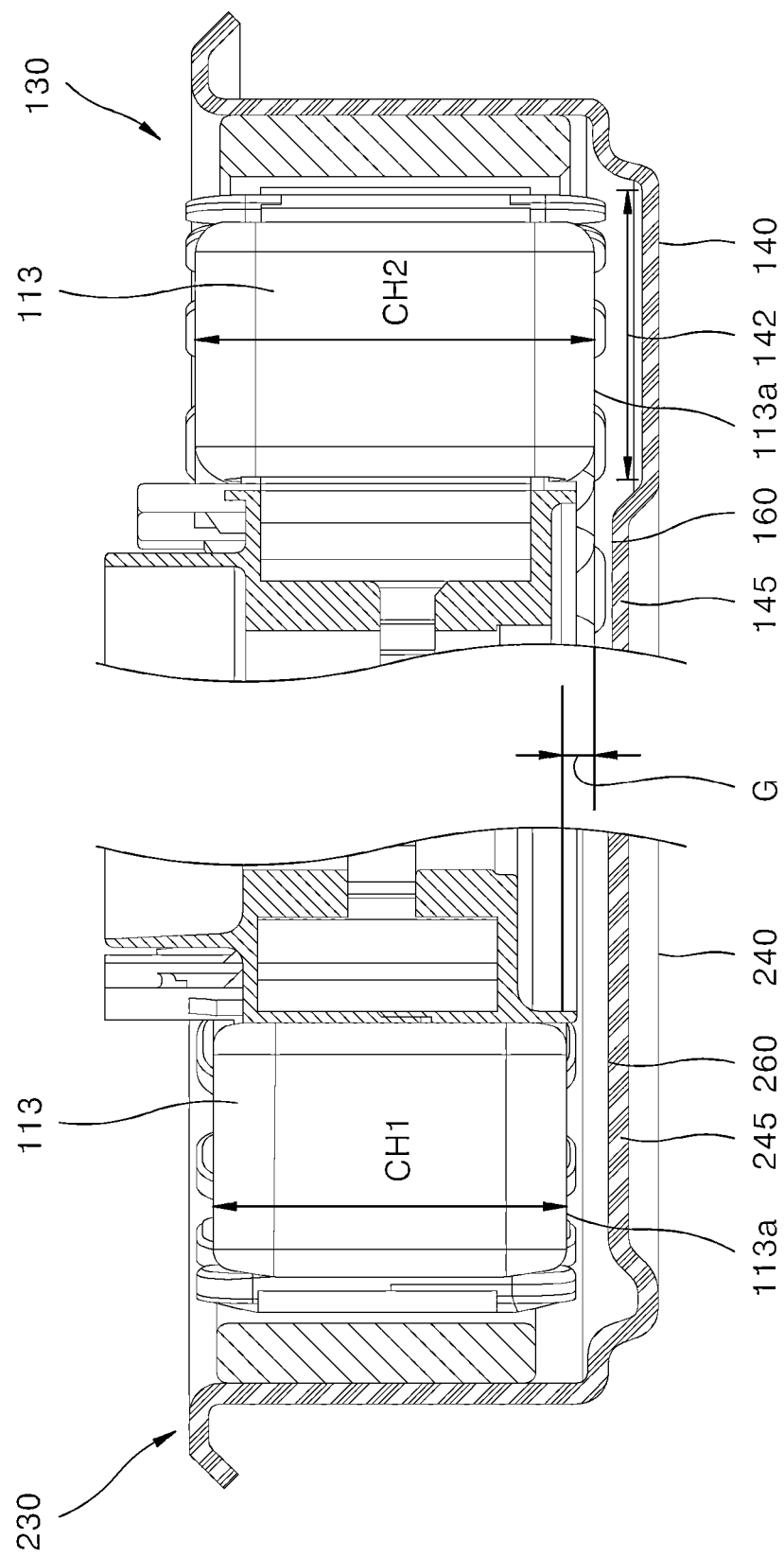
FIG. 26 is a view showing a difference in possible coil winding height between an example of the present disclosure and the comparative example.

FIG. 26 is a view showing a difference in possible coil winding height between an example of the present disclosure and the comparative example.

Referring to FIG. 26, in the case of the rotor frame 230 according to the comparative example, the bead 245 and the blade 260 are formed up to the coil arrangement region in the base frame 240. Accordingly, the rotor frame 230 has a layout structure in which a lower end 113a of a coil 113 wound around a stator core faces the bead 245 and the blade 260 protruding to set heights. As a result, a winding volume of the coil 113 is unavoidably reduced by the protruding heights of the bead 245 and the blade 260 and causes the output and efficiency of the motor to decrease.

Unlike the comparative example described above, in the case of the rotor frame 130 according to the example of the present disclosure, the bead 145 and the blade 160 have a structure in which the bead 145 and the blade 160 are positioned outside the coil arrangement region 142 in which the coils are wound and disposed in the base frame 140. Accordingly, a lower end 113a of the coil 113 wound around the stator core does not face the bead 145 and the blade 160, and there is an advantage of no restriction on increasing a volume of the coil 113 due to the protruding heights of the bead 145 and the blade 160. In other words, the volume of the coil 113 can be sufficiently increased to improve the output and efficiency of the motor compared to the comparative example.

Referring to FIG. 26, in rotor frames having the same size, the coil 113 according to the comparative example has a height CH1, and the coil 113 according to the example has a height CH2. In this case, the height CH2 of the coil 113 according to the example may be greater than the height CH1 of the coil 113 according to the comparative example, and the example can have higher output and efficiency than those of the comparative example.

As described above, the example of the present disclosure can satisfy the compactness and high-efficiency of the motor by securing a height space for winding the coil, which is greater than that of the comparative example by a difference G.

Although the present disclosure has been described above with reference to the accompanying drawings, the present disclosure is not limited by the embodiments and drawings illustrated in the present specification, and it is clear that the present disclosure can be variously modified by those skilled in the art within the scope of the technical spirit of the present disclosure. In addition, although the operational effects according to the structure of the present disclosure have not been clearly described in description of the embodiments of the present disclosure, predictable effects according to the corresponding structure should also be recognized.

What is claimed is:

1. A motor for a laundry apparatus, comprising:
   a stator including:
      a core having an annular shape, and
      a coil wound around the core; and
   a rotor including:
      a magnet disposed outside the stator and spaced apart from the stator, and
      a rotor frame fixing the magnet and configured to rotate around the stator,
   wherein the rotor frame includes:
      a base frame having a circular shape and facing the coil, the base frame being spaced apart from the coil,
      an extension frame protruding from an edge of the base frame in a circumferential direction and having an inner circumferential surface, the magnet being fixed to the inner circumferential surface,
      an air inlet extending through the base frame and configured to suction air, and a blade disposed adjacent to the air inlet and protruding from the base frame, the blade being positioned outside a region in which the coil is disposed and faces the base frame.

2. The motor of claim 1, wherein the air inlet defines a plurality of holes inside the base frame, and
wherein the plurality of holes are arranged at the base frame around a center of the base frame and extend along a radial direction of the base frame.

3. The motor of claim 1, wherein the rotor frame further includes a plurality of beads defined at a surface of the base frame, and
wherein the plurality of beads are positioned outside the region around a center of the base frame and extend along a radial direction of the base frame.

4. The motor of claim 3, wherein the air inlet defines a plurality of holes inside the base frame,
wherein the plurality of holes are arranged at the base frame around the center of the base frame and extend along the radial direction of the base frame, and
wherein each of the plurality of holes is spaced apart from a side of each of the plurality of beads.

5. The motor of claim 1, wherein the rotor frame further includes a plurality of beads defined at a surface of the base frame, and
wherein one of opposite end portions of each of the plurality of beads extends in a radial direction of the base frame and is closer to a center of the base frame than the air inlet, and the other of the opposite end portions of each of the plurality of beads is smaller than a radius of the base frame and positioned outside the region.

6. The motor of claim 1, wherein the air inlet defines a plurality of holes inside the base frame,
wherein the plurality of holes are arranged at the base frame around a center of the base frame and extend along a radial direction of the base frame,
wherein the blade is connected to each of the plurality of holes in a longitudinal direction and has a plate shape, and
wherein a length of the blade is smaller than a length of each of the plurality of holes.

7. The motor of claim 1, wherein the air inlet defines a plurality of holes inside the base frame,
wherein the plurality of holes are arranged at the base frame around a center of the base frame and extend along a radial direction of the base frame, and
wherein the blade is positioned adjacent to one of opposite sides of each of the plurality of holes, the one of the opposite sides being determined based on a rotational direction of the rotor.

8. The motor of claim 1, wherein the air inlet defines a plurality of holes inside the base frame,
wherein the plurality of holes are arranged at the base frame around a center of the base frame and extend along a radial direction of the base frame, and
wherein the blade has a first end portion adjacent to the center of the base frame and a second end portion adjacent to the region, the second end portion having a greater height than the first end portion.

9. The motor of claim 8, wherein the rotor frame further includes a plurality of beads defined at a surface of the base frame,
wherein the first end portion of the blade has a smaller height than each of the plurality of beads, and
wherein the second end portion of the blade has a greater height than each of the plurality of beads.

10. The motor of claim 8, wherein an upper end of the blade has an inclined surface that increases a height of the blade from the first end portion of the blade toward the second end portion of the blade, the inclined surface being configured to guide a flow of air suctioned through the plurality of holes toward the coil.

11. The motor of claim 1, wherein the air inlet defines a plurality of holes inside the base frame,
wherein the plurality of holes are arranged at the base frame around a center of the base frame and extend along a radial direction of the base frame, and
wherein each of the plurality of holes has a first end portion adjacent to the center of the base frame and a second end portion adjacent to the region, the second end portion having a greater width than the first end portion.

12. The motor of claim 11, wherein each of the plurality of holes has a fan shape that gradually increases a width of each of the plurality of holes from the first end portion toward the second end portion.

13. The motor of claim 1, wherein the air inlet defines a plurality of holes inside the base frame,
wherein the plurality of holes are arranged at the base frame around a center of the base frame and extend along a radial direction of the base frame, and
wherein each of the plurality of holes is positioned outside the region.

14. A motor for a laundry apparatus, comprising:
a stator including:
a core having an annular shape, and
a coil wound around the core;
a rotor including:
a magnet disposed outside the stator and spaced apart from the stator, and
a rotor frame fixing the magnet and configured to rotate around the stator; and
a driving shaft configured to rotate based on a rotational force from the rotor frame,
wherein the rotor frame includes:
a shaft connecting part connected to the driving shaft,
a base frame having a circular shape and facing the coil with a distance the base frame and the coil, the shaft connecting part being positioned at a center of the base frame,
an extension frame protruding from an edge of the base frame in a circumferential direction and having an inner circumferential surface, the magnet being fixed to the inner circumferential surface,
an air inlet extending through the base frame and configured to suction air, and
a blade disposed adjacent to the air inlet and protruding from the base frame, the blade being positioned outside a region in which the coil is disposed and faces the base frame.

15. The motor of claim 14, wherein the air inlet defines a plurality of holes inside the base frame, and
wherein the plurality of holes are arranged at the base frame around the center of the base frame and extend along a radial direction of the base frame.

16. The motor of claim 14, wherein the rotor frame further includes a plurality of beads defined at a surface of the base frame, and
wherein the plurality of beads are positioned outside the region around the center of the base frame and extend along a radial direction of the base frame.

17. The motor of claim 16, wherein the shaft connecting part is positioned at a central stepped part protruding from the base frame, and
   wherein a first end portion of each of the plurality of beads is connected to an inclined circumferential surface of the central stepped part and is closer to the shaft connecting part than the air inlet, and a second end portion of each of the plurality of beads is positioned outside the region.

18. The motor of claim 14, wherein the air inlet defines a plurality of holes inside the base frame,
   wherein the plurality of holes are arranged at the base frame around the center of the base frame and extend along a radial direction of the base frame, and
   wherein the blade is connected to each of the plurality of holes in a longitudinal direction and has a plate shape.

19. The motor of claim 14, wherein the air inlet defines a plurality of holes inside the base frame,
   wherein the plurality of holes are arranged at the base frame around the center of the base frame and extend along a radial direction of the base frame, and
   wherein the blade is positioned adjacent to one of opposite sides of each of the plurality of holes, the one of the opposite sides being determined based on a rotational direction of the rotor.

20. The motor of claim 14, wherein the air inlet defines a plurality of holes inside the base frame,
   wherein the plurality of holes are arranged at the base frame around the center of the base frame and extend along a radial direction of the base frame,
   wherein an upper end of the blade has an inclined surface that increases a height of the blade from a first end portion of the blade toward a second end portion of the blade and that is configured to guide a flow of air suctioned through the plurality of holes toward the coil.

* * * * *